US007640320B2

(12) United States Patent
Madison et al.

(10) Patent No.: US 7,640,320 B2
(45) Date of Patent: Dec. 29, 2009

(54) METHOD AND SYSTEM FOR MANAGING DIGITAL CONTENT, INCLUDING STREAMING MEDIA

(75) Inventors: Justin Paul Madison, Richardson, TX (US); Anthony Joseph Rodiger, The Colony, TX (US); Syed Noman Kazmi, Plano, TX (US); William David Turner, Dallas, TX (US); Steven Alexander Roberts, Richardson, TX (US); Ghousuddin Syed, Richardson, TX (US); Vinay Polavarapu, Irving, TX (US); Bhargavaram Bulleyya Gade, Irving, TX (US)

(73) Assignee: Yahoo! Inc., Sunnyvale, CA (US)

( * ) Notice: Subject to any disclaimer, the term of this patent is extended or adjusted under 35 U.S.C. 154(b) by 1269 days.

(21) Appl. No.: 10/466,132

(22) PCT Filed: Jan. 18, 2002

(86) PCT No.: PCT/US02/01840

§ 371 (c)(1),
(2), (4) Date: Jul. 9, 2003

(87) PCT Pub. No.: WO02/057943

PCT Pub. Date: Jul. 25, 2002

(65) Prior Publication Data

US 2004/0083273 A1 Apr. 29, 2004

Related U.S. Application Data

(60) Provisional application No. 60/263,058, filed on Jan. 18, 2001.

(51) Int. Cl.
*G06F 15/16* (2006.01)

(52) U.S. Cl. .................. 709/219; 709/203; 709/204; 709/216; 709/218; 709/226; 707/9; 707/10; 705/14

(58) Field of Classification Search ................. 709/203, 709/204, 216, 218, 219, 226; 705/14; 707/9, 707/10
See application file for complete search history.

(56) References Cited

U.S. PATENT DOCUMENTS 6,226,672 B1   5/2001   DeMartin et al.

(Continued)

OTHER PUBLICATIONS

S. Cho and Y. Shin, "Multimedia Service Interworking over Heterogeneous Networking Environments," Electr. & Tele. Res. Inst. (RTRI). IEEE Network, Mar./Apr. 1999, pp. 61-69.

*Primary Examiner*—Jinsong Hu
(74) *Attorney, Agent, or Firm*—James J. DeCarlo; Greenberg Traurig, LLP

(57) ABSTRACT

Method and system for uploading, managing and delivering digital content, including streaming media. The system according to one embodiment allows receives digital content from the client (102), assigns a stream identifier (ID) to the content and stores the content. The client is given a playlist uniform resource locator (URL) for publishing on its web site (610), the URL including the stream ID. Activation of the URL by an end user (104) causes the stream to be served to the end user, without the client receiving or providing an indication of the specifics of where the content was stored. An embodiment of the present provides a system and method that permit clients to actively manage their content, including defining logical folders and subfolders containing item(s) of the content and defining logical stream groups, containing items of the content.

11 Claims, 28 Drawing Sheets

U.S. PATENT DOCUMENTS

| | | |
|---|---|---|
| 6,248,946 B1 | 6/2001 | Dwek |
| 6,438,579 B1 * | 8/2002 | Hosken ..................... 709/203 |
| 6,553,376 B1 * | 4/2003 | Lewis et al. .................. 707/10 |
| 7,313,604 B2 * | 12/2007 | Wood et al. ................ 709/219 |
| 2001/0037376 A1 * | 11/2001 | Ullman et al. .............. 709/218 |
| 2002/0010759 A1 | 1/2002 | Hitson et al. |
| 2002/0019768 A1 * | 2/2002 | Fredrickson et al. .......... 705/14 |
| 2003/0046335 A1 * | 3/2003 | Doyle et al. ................ 709/203 |
| 2004/0199657 A1 * | 10/2004 | Eyal et al. .................. 709/231 |

* cited by examiner

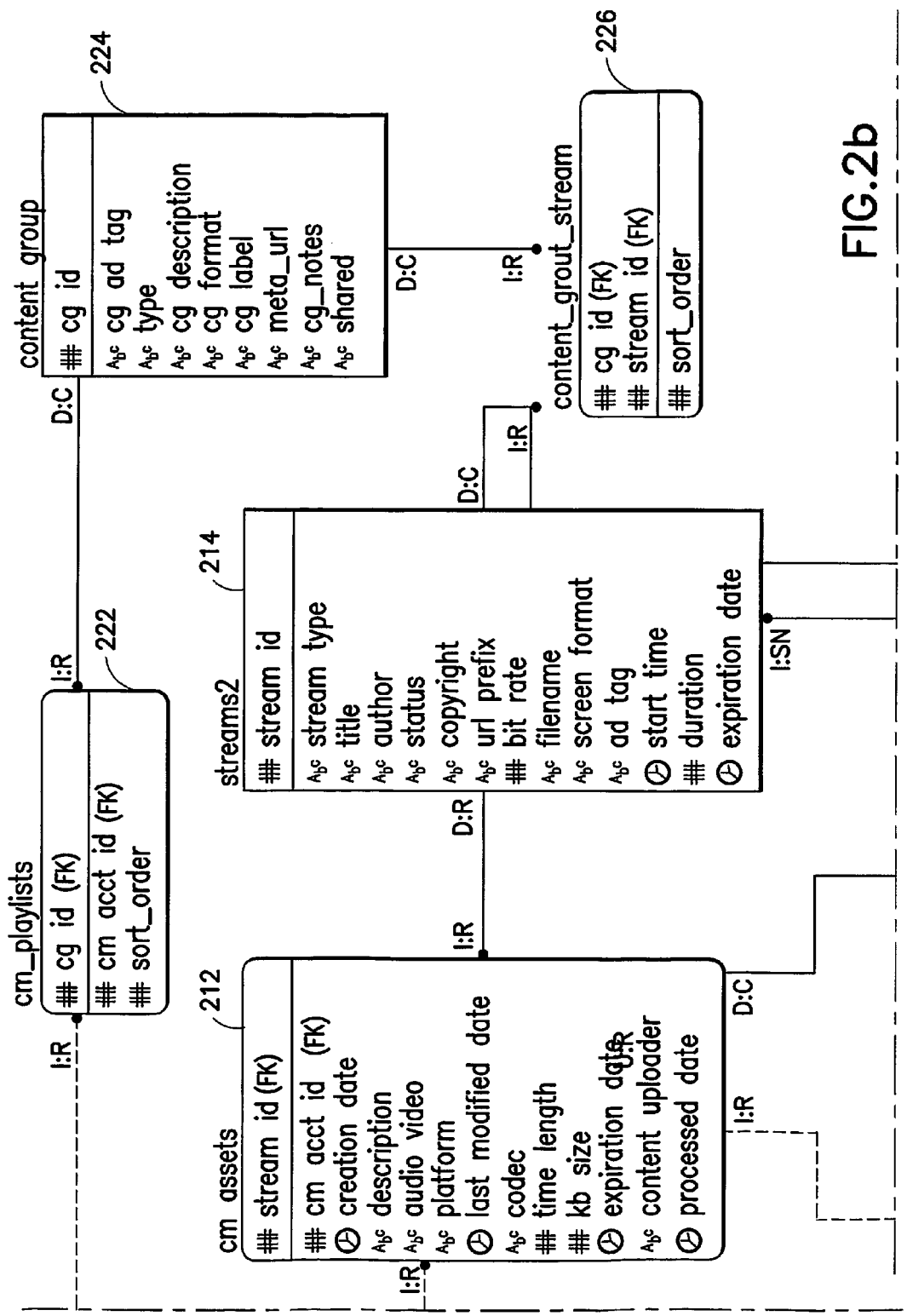

Content Management
MANAGE CONTENT / ADMIN | BROWSE FTP CONTENT | BATCH UPLOADS | PLAYLISTS | SEARCH | RECYCLE
UPLOAD NEW CONTENT Upload Content Form
- Media File: [_____] BROWSE
- Bitrate (Kbps): [SELECT HERE ▼]
- Title: [Upload Test Title]
- Author: [J Doe]
- Copyright: [© 2001. All Rights Reserved]
- Description: [◄ ►]
  Keywords: [_____] Add
  Current Keywords: [_____] Remove Secure Content? ☐
Security Key: [_____]
Security Interval: Hours: ☐ Minutes: ☐

[Upload Content]

306 testuser

FIG.3b

| | | | | testuser |
|---|---|---|---|---|
| Content Management | | | | |
| MANAGE CONTENT / ADMIN | | | | |
| UPLOAD NEW CONTENT | BROWSE FTP CONTENT | BATCH UPLOADS | PLAYLISTS | SEARCH | RECYCLE | | | |

FTP Upload Contents: \test ← 308

| | File Name | Creation Time | Size | |
|---|---|---|---|---|
| ☐ | 100 | 10/9/00 12:10 | 0.0 KB | |
| ☐ | 28 | 10/9/00 12:10 | 0.0 KB | 📄 |
| ☐ | 288 Test | 10/9/00 12:10 | 0.0 KB | 📄 |
| ☐ | 300 | 10/9/00 12:10 | 0.0 KB | 📄 |
| ☐ | 56 | 10/9/00 12:10 | 0.0 KB | 📄 |
| ☐ | bturner_28 | 11/29/00 04:13 | 0.8 KB | 📄 |
| ☐ | ChildTest | 12/15/00 12:41 | 270.7 MB | 📄 |
| ☐ | DO_NOT_DELETE | 10/9/00 12:10 | 0.0 KB | 📄 |
| ☐ | Real | 10/9/00 12:10 | 0.0 KB | 📄 |
| ☐ | SyedBatchUpload | 12/15/00 01:09 | 51.5 MB | 📄 |
| ☐ | SyedsDirDontDelete | 1/16/01 15:13 | 0.1 KB | 📄 |
| ☐ | .dsx | 1/16/01 15:13 | 0.7 MB | 📄 |
| ☐ | Copy of test.asf | 1/16/01 15:13 | 0.2 MB | 📄 |
| ☐ | demo.asf | 10/9/00 12:10 | 10.0 KB | 📄 |
| ☐ | File13.rm | 10/9/00 12:10 | 10.0 KB | 📄 |
| ☐ | File131.rm | 10/9/00 12:10 | 10.0 KB | 📄 |
| ☐ | File133.rm | 10/9/00 12:10 | 10.0 KB | 📄 |
| ☐ | File134.rm | 10/9/00 12:10 | 10.0 KB | 📄 |
| ☐ | File135.rm | 10/9/00 12:10 | 10.0 KB | 📄 |
| ☐ | File136.rm | 10/9/00 12:10 | 10.0 KB | 📄 |
| ☐ | File137.rm | 10/9/00 12:10 | 10.0 KB | 📄 |

[DELETE]

310 — (upper group); 312 — (lower group)

FIG. 3c

Content Management                                                                                        testuser
MANAGE CONTENT / ADMIN
UPLOAD NEW CONTENT | BROWSE FTP CONTENT | BATCH UPLOADS | PLAYLISTS | SEARCH | RECYCLE Batch Uploads
Available Batch Files                                         [ PROCESS ]   [ DELETE ]

| | File Name | Creation Time | Size | |
|---|---|---|---|---|
| ☐ | 1–100. bul | 10/9/00 12:10 | 7.9 KB | |
| ☐ | 101–200. bul | 10/9/00 12:10 | 8.1 KB | 🗑 |
| ☐ | 26– anthony.bul | 10/9/00 12:10 | 0.1 KB | 🗑 |
| ☐ | BillDefault.txt | 10/6/00 10:38 | 0.1 KB | 🗑 |
| ☐ | BillsSmBatch.txt | 1/18/01 12:28 | 0.3 KB | 🗑 |

314

Batch Process Summary

| Batch File | Submit Time | Process Start Time | Process End Time |
|---|---|---|---|
| BillDefault.txt | 11/15/00 10:26:51 AM | 11/16/00 4:13:02 AM | 11/16/00 4:13:07 AM |
| SyedTest 20001116.bul | 11/16/00 4:44:11 AM | 11/16/00 4:53:00 AM | |
| 100 RM Files.bul | 1/18/01 5:27:50 AM | 1/18/01 5:39:22 AM | 1/18/01 5:46:45 AM |
| 100 WM Files.bul | 1/18/01 5:27:50 AM | 1/18/01 5:46:45 AM | 1/18/01 5:53:59 AM |
| 10RMfiles.bul | 1/18/01 8:16:06 AM | 1/18/01 8:20:01 AM | 1/18/01 8:21:19 AM |
| 10WMFiles.bul | 1/18/01 8:16:08 AM | 1/18/01 8:21:19 AM | 1/18/01 8:22:22 AM |

Content Management testuser

MANAGE CONTENT/ADMIN
UPLOAD NEW CONTENT | BROWSE FTP CONTENT | BATCH UPLOADS | PLAYLISTS | SEARCH | RECYCLE

Search Content:

[ BROWSE ]

Title: ▭
Author: ▭
Key Words: ▭

I.D. ▭
Creation Date: [=▶] ▭ (i.e. 4/2/2000)
Duration: [=▶] ▭ (Enter values in minutes)

Display Results as XML? ☐
Show Child Account Content? ☐

Content Management testuser

MANAGE CONTENT/ADMIN
UPLOAD NEW CONTENT | BROWSE FTP CONTENT | BATCH UPLOADS | PLAYLISTS | SEARCH | RECYCLE

Browse Content:

Title: [          ]

Author: [          ]    I.D. [          ]

Key Words: [          ]    Creation Date: [=▶] [          ] (i.e. 4/2/2000)

Duration: [=▶] [          ] (Enter values in minutes)  [BROWSE]

☐ Display Results as XML?    ☐ Show Child Account Content?

Search Results:    [Create Playlist]  [Delete]

| | ID | Title | Type | Description | Creation Date | File Size | Status | |
|---|---|---|---|---|---|---|---|---|
| ☐ | 793735 | Steves Test | WMT | | 11/1/00 2:69 PM | 172 KB | Available | 🗎🗎 |
| ☐ | 943435 | ASF Upload Test | WMT | | 12/8/00 10:57 AM | 1,034 KB | Available | 🗎🗎 |
| ☐ | 943436 | ASF Upload 2 | WMT | | 12/8/00 10:57 AM | 127 KB | Available | 🗎🗎 |
| ☐ | 943437 | ASF Upload 3 | WMT | | 12/8/00 10:58 AM | 127 KB | Available | 🗎🗎 |
| ☐ | 943439 | ASF Upload 4 | WMT | | 12/8/00 10:58 AM | 127 KB | Available | 🗎🗎 |
| ☐ | 943441 | ASF Upload x | WMT | | 12/8/00 10:58 AM | 127 KB | Available | 🗎🗎 |
| ☐ | 944032 | Upload Test Title | G2 | | 12/8/00 2:44 PM | 10 KB | Available | 🗎🗎 |
| ☐ | 944036 | Upload Test Title | G2 | | 12/8/00 2:45 PM | 10 KB | Available | 🗎🗎 |
| ☐ | 944503 | Upload Test Title | WMT | | 12/8/00 5:26 PM | 172 KB | Available | 🗎🗎 |
| ☐ | 944510 | Upload Test Title | G2 | | 12/8/00 5:33 PM | 10 KB | Available | 🗎🗎 |

FIG.3h

Content Management

MANAGE CONTENT/ADMIN
UPLOAD NEW CONTENT | BROWSE FTP CONTENT | BATCH UPLOADS | PLAYLISTS | SEARCH | RECYCLE

Recycle Bin

[Select All] [Deselect All]

| ☐ | ID | Title | Type Description | Deletion |
|---|---|---|---|---|
| ☐ | 793769 | Secure Content Test | WMT | 5/8/01 |
| ☐ | 798500 | Ingest Test | G2 | 5/8/01 |
| ☐ | 798536 | Ingest Test | G2 | 5/8/01 |
| ☐ | 803442 | Test | G2 | 5/8/01 |
| ☐ | 803583 | Ingest Test | WMT | 5/8/01 |
| ☐ | 805118 | FTP Ingest Test | G2 | 5/8/01 |
| ☐ | 805124 | Ingest Test | WMT | 5/8/01 |
| ☐ | 805550 | Ingest Test | G2 | 5/8/01 |
| ☐ | 818713 | AutoArchive HTTP Ingest Test | G2 | 5/8/01 |
| ☐ | 818728 | AutoArchive Cross-Account Upload Test | G2 | 5/8/01 |
| ☐ | 818735 | AutoArchive FTP Ingest Test | G2 | 5/8/01 |
| ☐ | 818753 | AutoArchiveTest for vbs script ingest.a | G2 | 5/8/01 | testuser

FIG.3j-1

| | | | | |
|---|---|---|---|---|
| ☐ | 818806 | AutoArchive HTTP Ingest Test | G2 | 5/8/01 |
| ☐ | 818809 | AutoArchive FTP Ingest Test | G2 | 5/8/01 |
| ☐ | 818815 | AutoArchiveTest for vbs script ingest.a | G2 | 5/8/01 |
| ☐ | 818819 | AutoArchive Cross-Account Upload Test | G2 | 5/8/01 |
| ☐ | 818856 | Ingest Test (BTumer) | WMT | 5/8/01 |
| ☐ | 818858 | Another Upload Test (BT) | G2 | 5/8/01 |
| ☐ | 818861 | BT Test Again | WMT | 5/8/01 |
| ☐ | 867345 | Ingest Test GSyed | G2 | 5/8/01 |
| ☐ | 867346 | Ingest Test GSyed | G2 | 5/8/01 |
| ☐ | 870081 | This is a test title | G2 | 5/8/01 |
| ☐ | 870173 | Bill T TitleTest | G2 | 5/8/01 |
| ☐ | 872066 | Ingest Test from FTP (injust004) | G2 | 5/8/01 |
| ☐ | 872096 | Ingest Test (direct on (injust004) | G2 | 5/8/01 |
| ☐ | 874436 | Scott Susen's Test | WMT Some Descreption | |
| ☐ | 874472 | Ingest Test | G2 | 5/8/01 |
| ☐ | 874730 | Ingest Test | WMT | 5/8/01 |
| ☐ | 875368 | Ingest Test | WMT | 5/8/01 |

FIG.3j-2

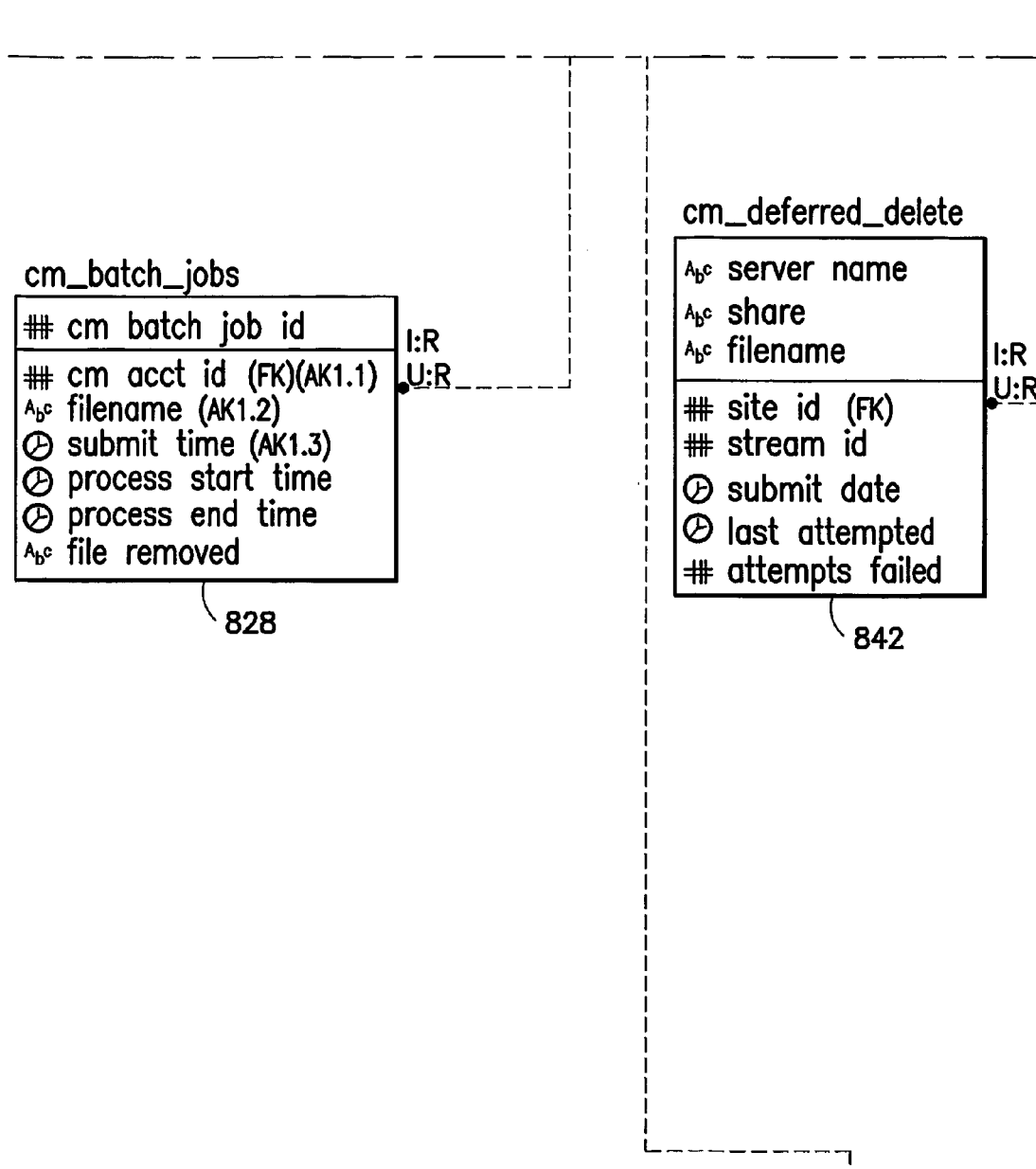

METHOD AND SYSTEM FOR MANAGING DIGITAL CONTENT, INCLUDING STREAMING MEDIA

CROSS REFERENCE TO RELATED APPLICATIONS

This application is a continuation-in-part of, and claims the benefit of, U.S. Provisional Application No. 60/263,058, filed on Jan. 18, 2001, for METHOD AND SYSTEM FOR MANAGING STREAMING MEDIA, hereby incorporated by reference.

BACKGROUND OF INVENTION

1. Field of the Invention

The present invention relates generally to a method and system for providing digital content via the Internet and, more particularly, to a method and system for allowing clients to up-load, manage, and deliver streaming media content via the Internet.

2. Description of Related Art

With the advent of the Internet and the World Wide Web, an industry has developed around the delivery of digital content, such as streaming media content. By way of example, streaming media may be used for any of a number of purposes, including entertainment, distance learning and corporate purposes. Entertainment companies stream movies and sporting events, distance learning companies stream educational content, and corporations stream training materials.

Although some streaming media content providers may have relatively few items of content to provide, some content providers have hundreds, even thousands of content files. Storing and streaming this number of content files can be costly. Furthermore, streaming content requires a level of technical expertise often not found in companies focusing on creating content. Consequently, content providers have turned to content management service providers to store and stream content on behalf of the content providers.

As more content providers turn to service providers for their streaming technology needs, service providers must manage more client accounts and greater numbers of content files. Furthermore, to maintain existing content provider clients and attract new clients, service providers must provide a content management system that not only is capable of organizing large numbers of content files, but also is easy for the content providers to use. Accordingly, there exists a need for a content management system that allows clients to easily up-load, manage, and deliver streaming media content via the Internet.

SUMMARY OF THE INVENTION

The present invention solves the foregoing and other needs. In certain embodiments, a method and system is provided for allowing client content providers to upload, manage and deliver streaming media and other digital content. The system according to one embodiment allows receives digital content from the client, assigns a stream identifier (ID) to the content and stores the content. The client is given a playlist uniform resource locator (URL) for publishing on its web site, the URL including the stream ID. Activation of the URL by an end user causes the stream to be served to the end user, without the client receiving or providing an indication of the specifics of where the content was stored.

Another embodiment of the present invention permits clients to actively manage their content, including defining logical folders and subfolders containing item(s) of content; defining logical stream groups, containing items of content.

A system according to one embodiment of the present invention couples one or more media servers to a storage server. While the storage server has stored a copy of the content, the media servers coupled thereto do not. In operation, the media servers perform a read of the contents stored at the storage server when requested by an end user.

BRIEF DESCRIPTION OF THE DRAWINGS

The following drawing figures, which form a part of this application, are illustrative of embodiments of the present invention and are not meant to limit the scope of the invention in any manner, which scope shall be based on the claims appended hereto.

FIGS. 2*a-d* is a schematic illustrating the database of one embodiment of the present invention;

FIGS. 3*a-j* are web pages of the Content Management client-side web site according to one embodiment of the present invention;

FIGS. 8*a-g* represent a schematic illustrating the database of the embodiment of FIG. 6.

DETAILED DESCRIPTION OF PREFERRED EMBODIMENTS

Figure 1:
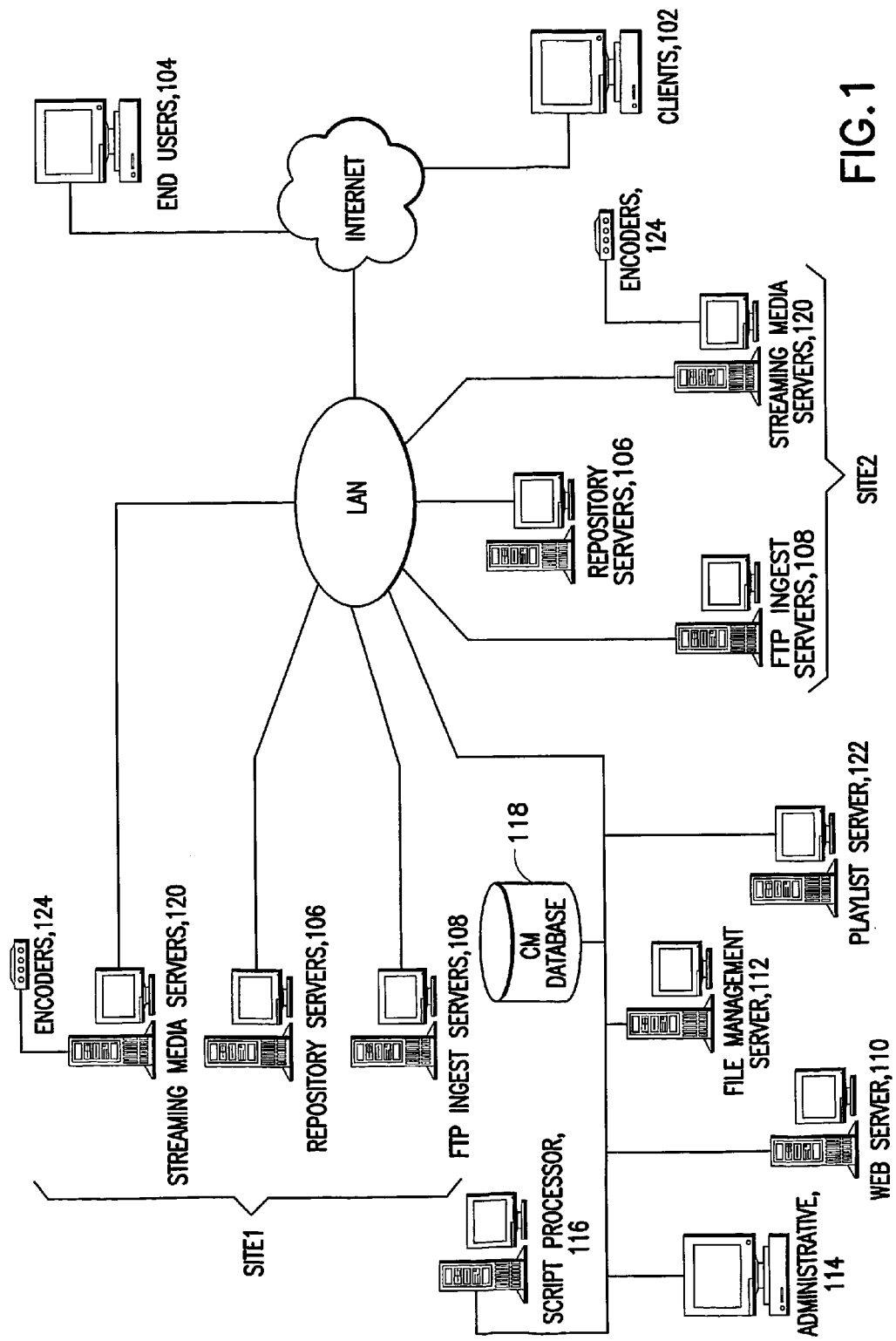
FIG. 1 is a schematic illustrating the system architecture of one embodiment of the present invention.

Certain preferred embodiments of the present invention will now be discussed with reference to the aforementioned figures, wherein like reference numerals refer to like components. Turning first to the schematic of FIG. 1, a system 100 according to one embodiment of the present invention is shown. In general, the system 100 allow clients 102 to up-load streaming media content to the system 100, manage such content, and make the content available to end-users 104 via a web site on the Internet.

As will become apparent from the following discussion, each of the clients 102 and end-users 104 has a processor, such as a personal computer (PC), web enabled cellular telephone or personal digital assistant (PDA) and the like, coupled to the Internet by any one of a number of known manners. Furthermore, each client 102 preferably includes an Internet browser, such as that offered by Microsoft Corporation under the tradename INTERNET EXPLORER or that offered by Netscape Corp. under the tradename NETSCAPE NAVIGATOR, as well as file transfer protocol (FTP) client software for interacting with various components of the system 100. Additionally, each end-user processor preferably includes an Internet browser, such as INTERNET EXPLORER or NETSCAPE NAVIGATOR, and a media player, such as that offered by Microsoft Corporation under the tradename WINDOWS MEDIA PLAYER or that offered by Real Networks Corp. under the tradename REALPLAYER. It is to be understood that although the present embodiment is described in terms of Windows Media content and Real Media content, it is within the scope of the present invention to utilize any media format heretofore or hereafter known. Furthermore, it is to be understood that although the present embodiment is described in the context of streaming media, the present invention is applicable to digital content other than streaming media.

As discussed in greater detail below, the client 102 up-loads streaming media content to the repository or storage server (and associated storage) 106 either directly, via an HTTP up-load, or via an FTP ingest server (and associated storage) 108. Once the client 102 has up-loaded its streaming media content, the client may manage its content via web pages on a content management web site provided by a client-side web server 110. As discussed in greater detail with reference to FIG. 3a-j, the web site serves as an interface through which the client 102 may log into its account and select any of the following exemplary functions: up-load new content; search the client's existing up-loaded content; create and edit playlists; browse the client's contents stored on the FTP server 108; and perform a batch up-load of content from the FTP server 108 to the repository server 106. Additionally, the web site serves as an interface for the client 102 to perform various administrative functions, such as setting and changing any of the client-defined account and file information described below. In alternate embodiments, clients 102 may manage their accounts programmatically, via scripts running on the web server 110 or other system service described below.

The system further includes a file management server 112, administrative staff terminals 114, and a script processor 116. In general, the file management server 112 controls the activities of the various other components to which it is coupled and the movement of content within the system. The administrative terminals 114, in turn, are coupled to the file management server 112 to allow the administrative staff of the content management service provider maintaining the content management system 100 to control and monitor the system 100. The script processor 116 works in conjunction with the file management server 112 to control operation of the system 100 by running various software scripts and/or components performing most of the functionality described herein. As described in greater detail below, the script processor 116 includes various software modules, including a task scheduler and program scripts and objects for batch up-loads of content files and for recovery of deleted content files. It is to be understood that such task scheduling software may be obtained by any of a number of third-party vendors. Similarly, based upon the description of the program scripts and objects herein, the program scripts and objects may be written in any programming language heretofore or hereafter known, such as PERL, Visual Basic, JavaScript, C++, and the like.

The content management system 100 also includes a Content Management (CM) Database 118. As described in greater detail below with reference to FIG. 2, the CM Database 118 includes numerous relational databases or tables in a database. In general, the CM Database 118 preferably includes account information, which identifies each client's account, stream information, which identifies and describes each item of streaming content within a client's account, playlist information, which identifies and describes each client's playlist, batch information, which defines the status of each client's batch up-load requests, and storage location-information, which tracks the storage of content on the repository 106 and streaming media 120 servers.

Under direction of the file management server 112, the up-loaded content is eventually transferred from the repository server 106 to one or more streaming media server (and associate storage) 120, where it is available for streaming via the Internet. As described in greater detail below, the current embodiment utilizes a playlist server 122 for dynamically generating a playlist metafile (such as ASX, RAM, SMIL, and RPM files, to name a few) to be provided to the end-user's windows media player. In addition to the archived content located on the streaming media server storage 120, the present environment provides for streaming of live content acquired via encoders 124 coupled to the streaming media servers 120.

As illustrated in FIG. 1, while the clients 102 and end-users 104 are coupled to each other and to the content management system 100 via the Internet, the service provider's components are coupled to each other via a local area network (LAN). More specifically, the repository 106, FTP server 108, client web server 110, file management 112, administrative terminals 114, script processor 116, CM Database 118, streaming media server 120, and playlist server 122 are all in communication via a secure LAN. In alternate embodiments, components of the system are coupled differently, for example, each coupled directly to the Internet, coupled via a wide area network (WAN) and the like.

In general, the division of functionality among the web server 110, file management server 112, playlist server 122 and script processor 116 described herein is exemplary, as the functions may be segregated and grouped differently. For example, it is to be understood that although the present embodiment utilizes client web servers 110 that are separate from the playlist server 122, in alternate embodiments the functionality of the playlist server 122 described herein may be implemented in software residing on the web server 110, thereby obviating the need for a separate playlist server.

Content Management Database 118

The Content Management (CM) Database 118 will now be described in greater detail with reference to FIG. 2, and continuing reference to FIG. 1. The CM Database 118 includes several logically discrete tables of information, each of which is described below. As will be appreciated by one skilled in the art, the following logical arrangement of information in tables is exemplary, and other arrangements are within the scope of the present invention; for example; those with fewer or more tables and/or fewer or more fields. It is also to be understood that although the CM Database 118 is described as a central database, it is within the scope of the present invention to distribute the contents of the CM Database 118 throughout the system.

The CM Database 118 includes a CM Accounts Table 210. In general, the CM Accounts Table 210 includes records for each client account, as identified by a CM account ID. Each such record includes account identifying information, such as account name, account directory, username, password, contact information (such as contact name, e-mail address, and telephone number), default title and author (which are preferences used to identify items of content in the event no other title or author information is provided by the client 102), parent account ID (in the event the current account is related as a child to another account), an indication of whether or not the client has an FTP account, and maximum allowable amount size of content (e.g., in Kilo-bytes). It is within the scope of the present invention to implement security features to maintain the integrity of the content, such as those features and methods described in applicant's co-pending International Application No. PCT/US01/46726, filed Nov. 5, 2001, for SYSTEM AND METHOD FOR CONTROLLING ACCESS TO DIGITAL CONTENT, INCLUDING STREAMING MEDIA and International Serial No. PCT/US01/18324, filed Jun. 6, 2001, for SYSTEM AND METHOD FOR CONTROLLING ACCESS TO DIGITAL CONTENT, INCLUDING STREAMING MEDIA, which are hereby incorporated by reference. As such, the table includes security related information, including default preferences indicating whether or not the content is secure (allows security), and if so, a cryptographic key used for accessing such content (default sec key) and a time period for which the key will be valid (default sec. interval).

The CM Accounts Table 210 also includes a field for a "site id," which uniquely identifies a site consisting of a group of one or more FTP servers 108 and those repository servers 106 and streaming media servers 120 to which the content on the FTP servers 108 can be up-loaded. Two representative sites are illustrated in FIG. 1, although the system 100 could have any number of sites. Although not required in the present invention, each client account is associated with a site located in the client's geography or the geography where the endorsers 104 likely to access the client's content are located so to speed delivery of the streaming media content. Furthermore, it is to be understood that logically grouping the FTP server 108, repository servers 106 and streaming media servers 120 into sites is not required. As noted below, much of the account identifying information of the present embodiment is provided by the client 102 during the registration process.

The CM Database 118 further includes a series of tables containing content-identifying information. More specifically, the CM Assets Table 212 includes records, each of which identifies an item of streaming content by a stream ID. Furthermore, each record includes the CM account ID, creation date of the item of content, description of the content, an identification of whether the content is audio and or video, the platform to which the content relates, the date on which the content was last modified, any code necessary for viewing of the content, the length and size of the content, the expiration date (if any) of the content, the individual that up-loaded the content and the date on which the content was processed into the system 100. It is to be understood that each record in the CM assets Table 212 correlates an item of content, as identified by the stream ID, to a particular client account, by reference to the CM account ID.

The Streams2 Table 214 also includes records identifying each item of content, as identified by the stream ID. Fields contained in the Streams2 Table 214 include the stream type, such as windows media player or real media player, title of the content, author of the content, status of the content, copyright notice for the content, URL prefix, bite rate of the content, file name of the content (as provided by the client 102), stream format, such as windows media player or real media player, ad tag (which specified where an advertisement is to be inserted), start time (if the Stream is a portion of the file), duration, and expiration date.

Figure 2A:
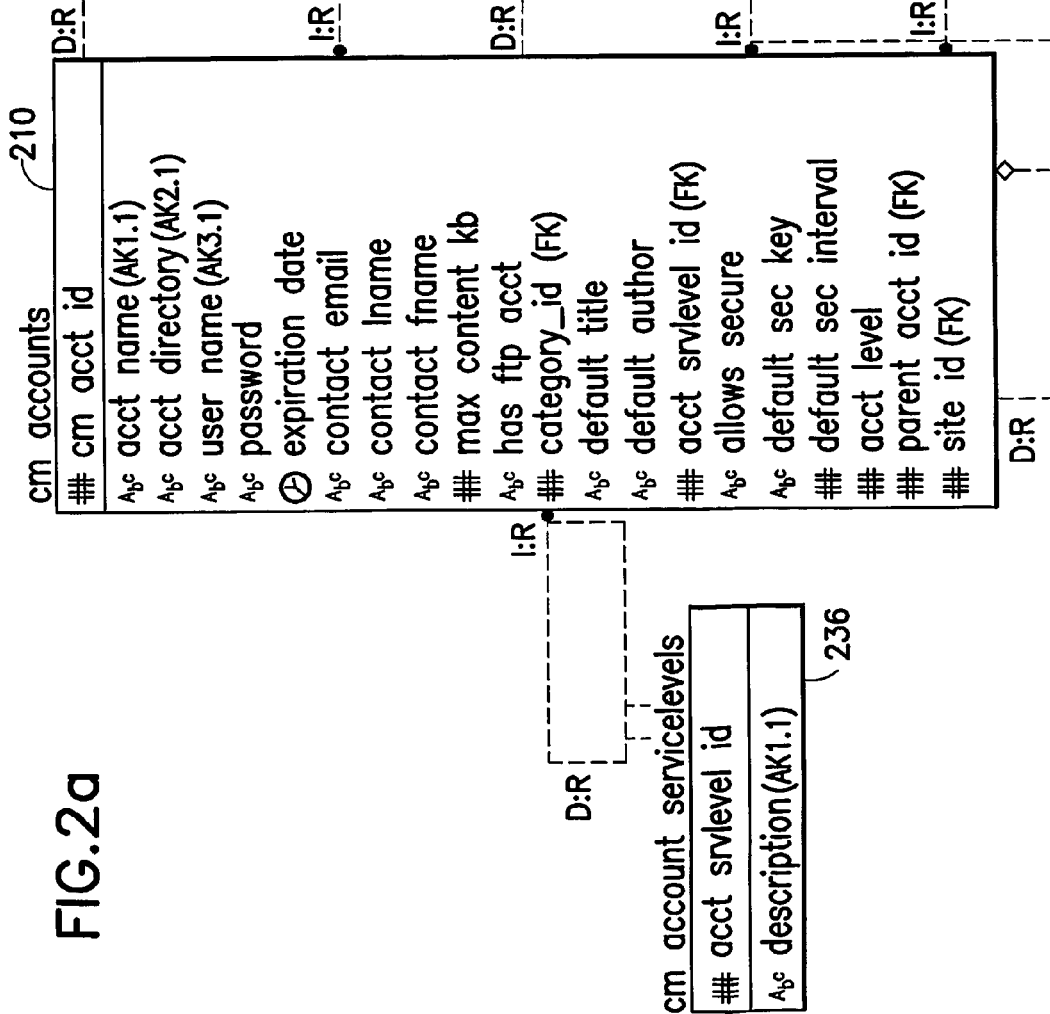
Figure 2C:
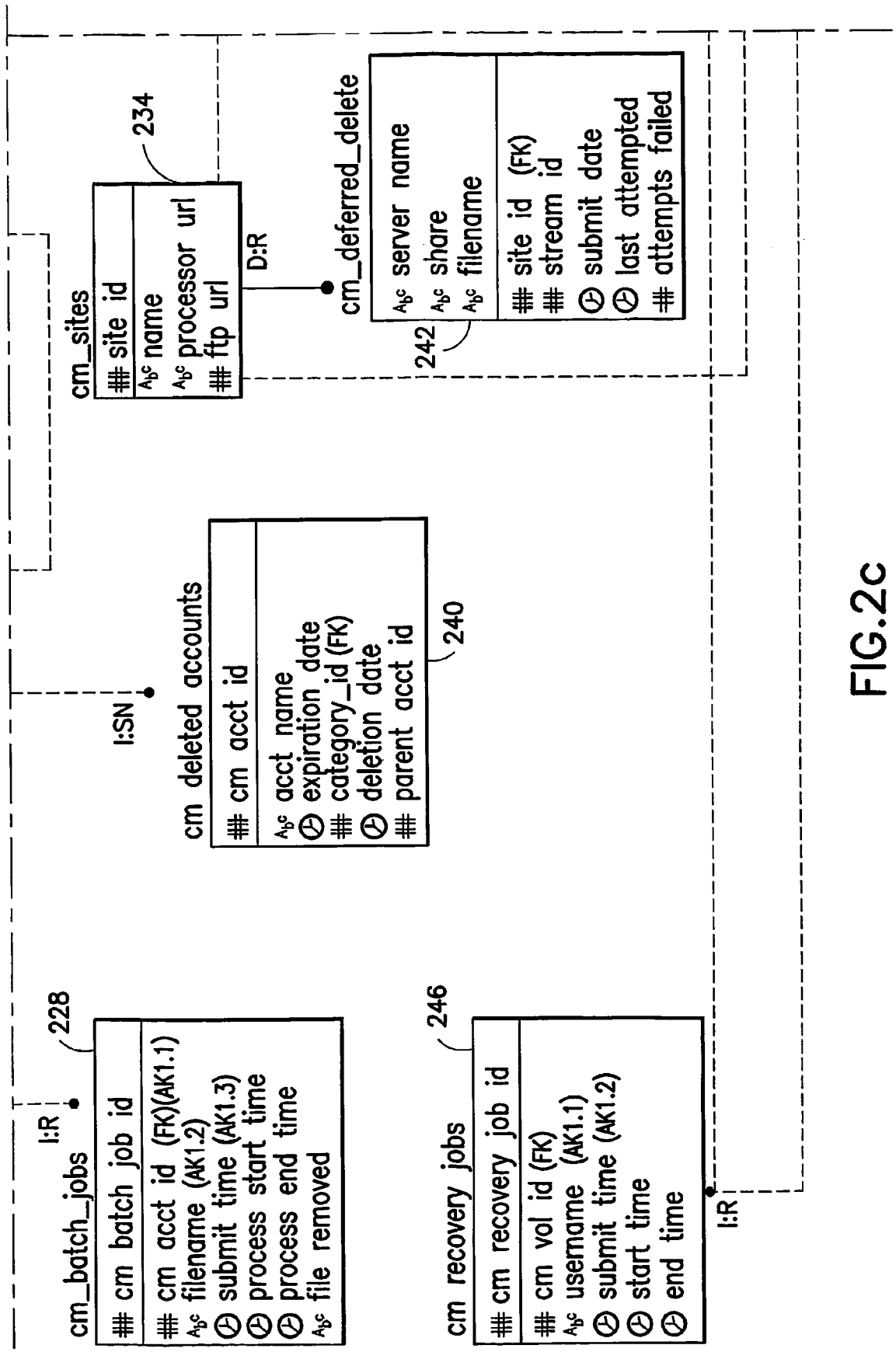
Figure 2D:
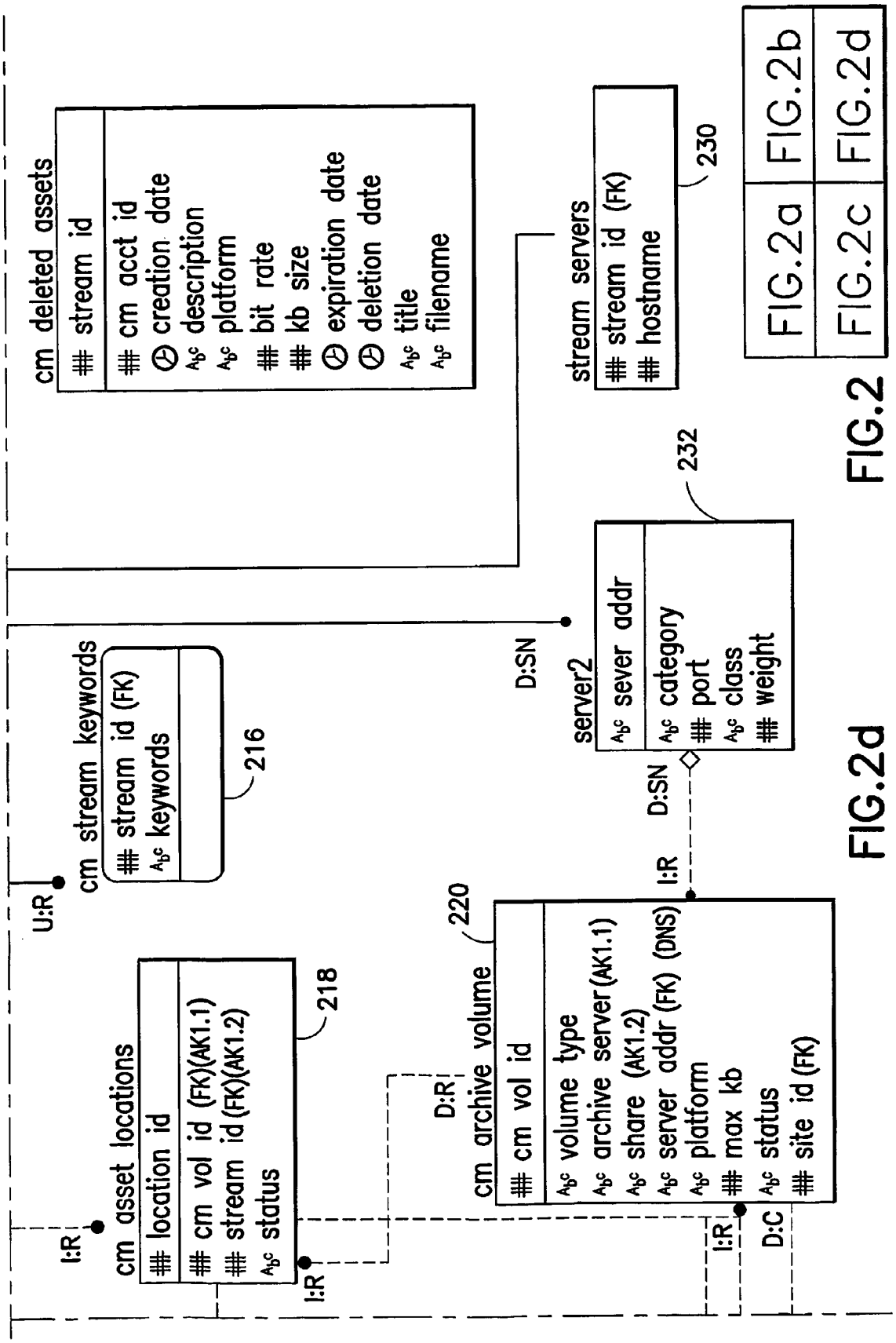

As illustrated in FIG. 2, the CM Assets Table 212 has three additional tables related thereto: the CM Stream Keywords Table 216, CM Assets Locations Table 218 and CM Archive Volume Table 220. The CM Stream Keywords Table 216 includes keywords, as provided by the client 102, for each item of content as identified by the stream ID.

The CM Assets Locations Table 218, which is also related to the CM Assets Table 212, includes records identified by location ID. The location ID is a unique identifier for each portion of storage pertaining an item of content. As such, location IDs may refer to either a repository server 106 or a streaming media server 120. A given content file may be stored at multiple location ids, for example one on a media server 120 and one on a repository server 106. More specifically, each record in the CM Asset Locations Table 218 includes a CM volume ID, for identifying the portion of the server on which the associated content resides; stream ID, for identifying the item of content stored at the location ID; and status of the item of content. The status of the file corresponding to each location is determined based on the following table.

| Status | Meaning | Applicable to file located on: |
| --- | --- | --- |
| Available | File is present on a media server and is available for streaming | Streaming server |
| Back up | File has been copies to a streaming media server | Repository server |
| Copying | File is being copied to a repository server or media server | Repository server; media server |
| Deleting | File is being deleted | Repository server; media server |
| Failed | File up-load or copy has failed | Repository server; media server |
| Moving | File is being moved from the current server to another server of the same type | Repository server; media server |
| New | File has recently been up-loaded and not copied | Repository server |

The CM Archive Volume Table 220 is also related to the CM Asset Table 212 and, more particularly, to the CM Asset Locations Table 218. CM Archive Volume Table 220 includes records for each CM volume ID. Each record includes: volume type, which indicates whether the volume ID pertains to a repository server 106, streaming media server 120, FTP server 108, script processing server 116 or web server 110; archive server name, indicating the LAN name of the particular repository server 106 or streaming media server 120, as the case may be, containing the volume ID; the server's DNS address; the platform for the content, such as Window's Media or Real Media; the status of the content associated with the volume id; the maximum storage capacity for the server continuing the volume id; and the side id of the server containing the volume id.

Also associated with each client account identified in the CM Accounts Table 210 is client playlist information. Such playlist information is contained within the CM Playlists Table 222, Content Group (CG) Table 224 and CG Streams Table 226. In general, the CM Playlist Table 222 includes records identifying each client playlist, as identified by a content group ID. Each record further includes the CM account ID and the sort order, which indicates the ordering of the items of streaming content associated with the particular playlist.

Content Group Table 224 also includes records for each playlist, and identified by the playlist or content group (CG) ID. In general, each record contains the playlist details, including the CG ad tag, the type of playlist, the CG description, the CG format, the CG label, the meta-url for the playlist, CG notes, and an indication as to whether or not the content group is shared.

The playlist entries are identified in a CG Stream Table 226. More specifically, the CG Stream Table 226 includes records identifying each item of content as part of a content group and further includes an indication of the order of the particular item of content within the content group. As such, each record in the table includes the content group ID, stream ID, and sort order.

The CM Database 118 also includes a table that indicates its status of client-requested batch up-loads. More specifically, the CM Batch Jobs Table 228 includes records identifying the status of each requested batch job, as identified by a CM batch job ID. Each record in the CM Batch Job Table 228 includes the CM account ID, identifying the account to which the batch job relates, the file name of the batch file (filename), the time which the client 102 submitted the batch request (submit time), the time at which the process was started (process start time), the time at which the batch process ended (process end time), and an indication as to whether or not the batch file was removed from the client's account (file removed). Because each record in the CM Batch Jobs Table 228 includes the CM account ID, each such record is related to a record in the CM Accounts Table 210.

The CM Database also includes a Stream-Servers Table 230. The records in the Stream-Servers-Table 230 correlate each file, as identified by its stream ID, with the hostname (or domain name server (DNS) address) of the streaming server 120 on which it resides. While each stream ID will only have one record, a particular file will have as many records as it has copies residing on different streaming servers 120.

The Servers2 Table 232 includes a record for each streaming server 120, as identified by its server address, setting forth various metrics for the server 120, such as the weight or relative number of streams being served to end users 104.

The CM Sites Table 234 contains a record for each site, as identified by its site id. More specifically, each record identifies the name of the site, the FTP server uniform resource locator (URL) associated with the site and the processor URL associated with the site. In the present embodiment, each site only includes one FTP server 108.

As illustrated in FIG. 2, the CM Database also includes tables relating to the deletion and recovery of files, identifying each client's service level and categorizing the clients' accounts.

The Account Servicelevels Table 236 stores a description of each client's service level. As illustrated, this table 236 is keyed to the Account Table 210 by virtue of the account service level ID (acct srvlevel id) field. Each service level generally corresponds to a different set of options, functions and/or capabilities offered to the client, for example, the amount of storage allowed, number of uploads, the number of sites provided, and the like.

The Categories Table 238 stores records identifying the category to which a particular account relates. More specifically, each record corresponds to a particular category, as identified by category ID. In general, a category is a grouping of accounts, for example, of all accounts related to a particular parent account. Thus, each record identifies the parent ID, name, and description. As illustrated, records in the Categories Table 238 are keyed to accounts in the Account Table 210 by the category ID field.

The CM database 118 also tracks deleted accounts and deleted content. To this end, the Deleted Accounts Table 240 keeps a record for each account, identified by account ID, that is removed from the system 100. By keeping such records, the system administrator is able to provide accurate record keeping and report generation.

The Deferred Delete Table 242, Deleted Assets Table 244 and the Recovery Jobs Table 246 are used in the deletion of content. More specifically, a Stream may be deleted either upon request of the client 102 or based on the content expiring. As noted above, the Streams2 Table 214 includes an expiration date field for each Stream ID. A script running on the system periodically scans the Streams2 Table 214 for records having an expiration date equal to or greater than (i.e., after) the then current time. For each record containing such an expiration date, the systems proceeds to delete the content. The process of deletion of the present embodiment includes changing the status field in the Asset Locations Table 218 to expired and, in the Streams-Servers Table 230 changing the hostname for the stream being deleted to another system server that hosts a default message, indicating to the end user 104 that the requested content is not available. The system also replaces the stream's actual filename, as stored in the Streams2 Table 214, with the filename of such default message.

Upon deletion of a stream, a record is also created in the Deleted Assets Table 244, specifying various stream information, as well as the expiration date and deletion date of the content.

In the event the stream to be deleted is currently being provided to an end-user 104, the system will be unable to delete the content. In such an instance, the system creates a record in the Deferred Delete Table 242, specifying the server name, file name and share information for the content to be deleted. As illustrated, for each unique combination of server name, share information and file name, the Deferred we defer delete Table 242 also stores the site ID, stream ID, the date on which the delete request was submitted to the system, the date of the last attempted deletion, and the number of failed deletion attempts. A script running on the system periodically searches the Deferred Delete Table 242 for entry and, upon the finding a populated record, proceeds to attempt to delete the content specified by the entry. Upon successful deletion, an entry is created in a Deleted Assets Table 244 and a status is changed in the Asset Locations Table 218.

Registration Process

Having described the components of the present embodiment, the operation thereof will now be described. As an initial matter, each client 102 must register with the service provider. In general, such registration includes the client 102 providing the service provider with account identifying information, a subset of which includes client identifying information. More specifically, the client provides the account identifying and client identifying information contained within the CM Accounts Table 210. The client may also select the designed service level. In one embodiment of the present invention, the client 102 provides such information via a secure web page generated by the client web server 110. The client web server 110 receives the information and by executing a common gateway interface (CGI) script, writes the information via the LAN to the CM Database 118. In an alternate embodiment, the client 102 manually provides the information to the service provider, who, in turn, manually enters the information into the CM Database 118 via the administration terminals 114. In either embodiment, once the service provider receives the account identifying and client identifying information, a CM account ID is assigned and the corresponding record in the CM Accounts Table 210 is populated.

Client-Side Content Management Web Site

As noted above, the client web server 110 provides a content management web site that serves as an interface between the client 104 and the content management system. While the present embodiment utilizes such interactive web site for allowing the client 102 to interface with the system and to manage the client's content, it is to be understood that other interface devices may be used, including voice recognition devices, text-based systems, or by passing variables on a query string and running a script, or any other interface means. Furthermore, although the present embodiment passes data between the web server 110 and the script processor 116 in XML format, it is to be understood that other formats may be utilized. The content management web site of the present embodiment will now be discussed with reference to FIGS. 3*a-j*.

Figure 3A:
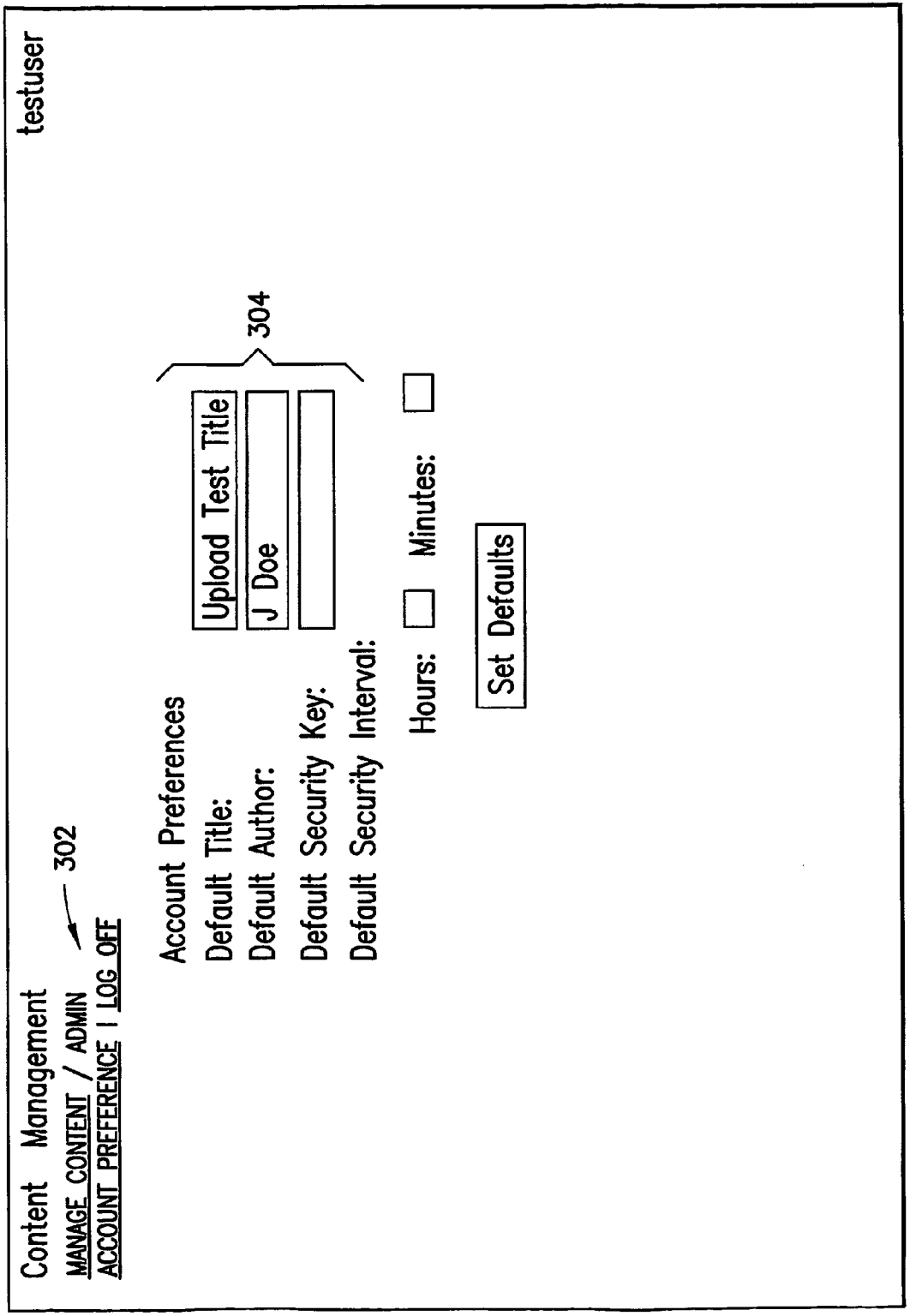

Once a client 102 logs into the system by submitting its username and password, the client is presented with the option to perform content management functions or administrative functions. As shown in FIG. 3*a*, when the client 102 selects administrative functions from a high level menu 302, the web page presents the client 102 with the ability to set account preferences, including default title, default author, default security key, and default security interval. As with the other web pages discussed herein, entry of information via the client 102 is received by the client web server 110 and placed in the appropriate fields in the CM database 118. With the account preferences web page of FIG. 3*a*, the default preferences are stored in the CM Accounts Table 210. In alternate embodiments, the web page also displays account settings such as maximum allowable storage (max content Kb), actual storaged used (e.g., sum of Kb size fields in Assets Table 212), and any other information stored in the database 118.

As shown in FIG. 3*b*, when the client 102 selects the manage content option in the high level menu, the web site presents the client with six options: "Upload New Content", "Browse FTP Content", "Batch Uploads", "Playlists", "Search" and "Recycle". When the "Upload New Content" option is selected, the system presents the client 102 with the web page shown in FIG. 3*b*. As discussed in greater detail below; the client 102 is able to identify a content file residing on its local machine, and upload the file to a repository server 106. In general, the client 102 specifies the file name and file details in an upload content form 306. These file details are then stored in the CM Assets Table 212 and the Streams2 Table 214. Notably, the account preferences set by the client 102 on the web page of FIG. 3*a* are provided as default entries in the upload content form 306.

When the client 102 selects the "browse FTP content" option, the system presents the client with the web page shown in FIG. 3*c*. As the name indicates, this option provides the client 102 with a listing of all content files previously uploaded by the client 102 to the client's FTP account on the FTP ingest server 108. The system first identifies the FTP ingest server 108 containing the client's FTP account. A call is made to the particular FTP ingest server 108, which in turn executes a script to read all file directories and files within the client's account. The FTP server 108 returns a listing of such file directories and files in XML format to the web server 110. The web server 110, in turn, converts the XML information into HTML, which is displayed to the client 102. As shown in FIG. 3*c*, the client 102 is presented with the name of its FTP account 308, as well as a listing of the client's file directories 310 and the client's content files 312.

The browse FTP content web page allows the client 102 to either delete a content file or cause a content file to be ingested from the FTP server 108 to a repository server 106. Such operations will be discussed in greater detail below.

The "batch uploads" option is shown in FIG. 3*d*. As shown therein, the batch upload web page of the current embodiment is divided into two sections: one illustrating the batch files which have been uploaded to the client's FTP account, but not processed; and one identifying the client's batch files for which processing has begun 316. By way of example, batch file "1-100.bul" has been uploaded but not processed, while batch file "BillDefault.txt" was previously uploaded and processed.

It should also be noted that the batch upload web page may display any file detail stored in the CM database 118 corresponding to each batch file. More specifically, for each batch file listed as having been processed, information may be extracted from the submit time, process start time and process end time fields of the CM Batch Jobs Table 228.

The listing of available batch files 314 is generated by the system browsing the client's FTP content and extracting all pure text files. The listing of processed batch files is created by the system by searching the CM Batch Jobs Table 228 for all records identified by the client's CM account ID. The client 102 may select one of the available batch files for either deletion or processing.

Figure 3E:
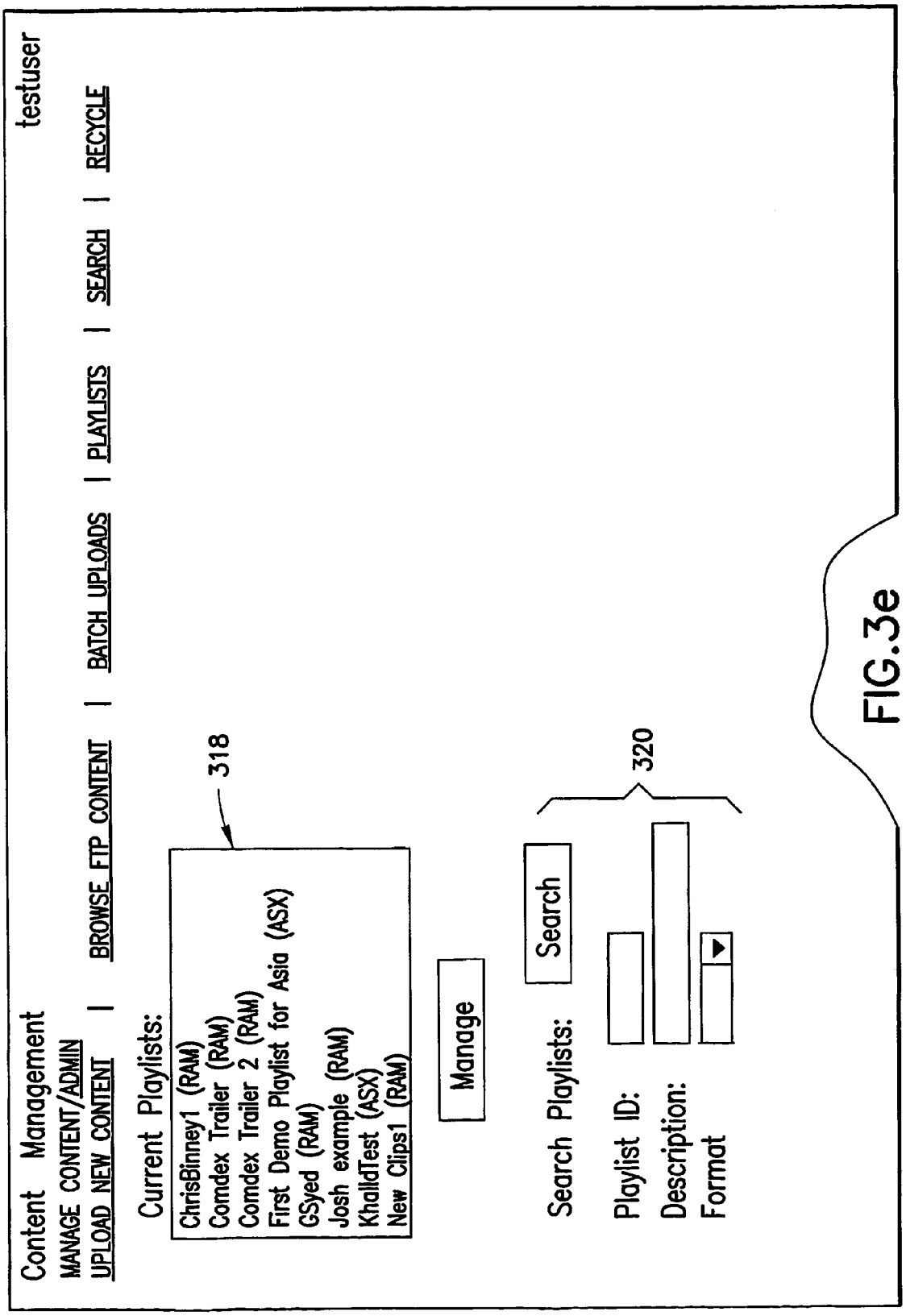

The web page displayed when the client 102 selects the "playlists" option is illustrated in FIG. 3*e*. In general, this web page provides the client 102 with the ability to edit playlists. To this end, the web page presents the client 102 with a list of current playlists 318. The system generates the list of playlists by searching the CM Playlists Table 222 for all entries corresponding to the client's CM account ID, thereby resulting in a list of playlist or content group (CG) IDs, each of which identifies a different playlist for the client 102. For each CG ID, the system retrieves the CG description and format in the Content Group Table 224. The information is transferred in XML format and displayed in the playlist list 318 in HTML format.

The system also provides the user with a search form 320, whereby the client 102 can enter playlist details, such as playlist/CG ID, CG description and CG format, in which the system uses in searching the Content Group Table 224 in order to return a list of matching playlists.

Figure 3F:
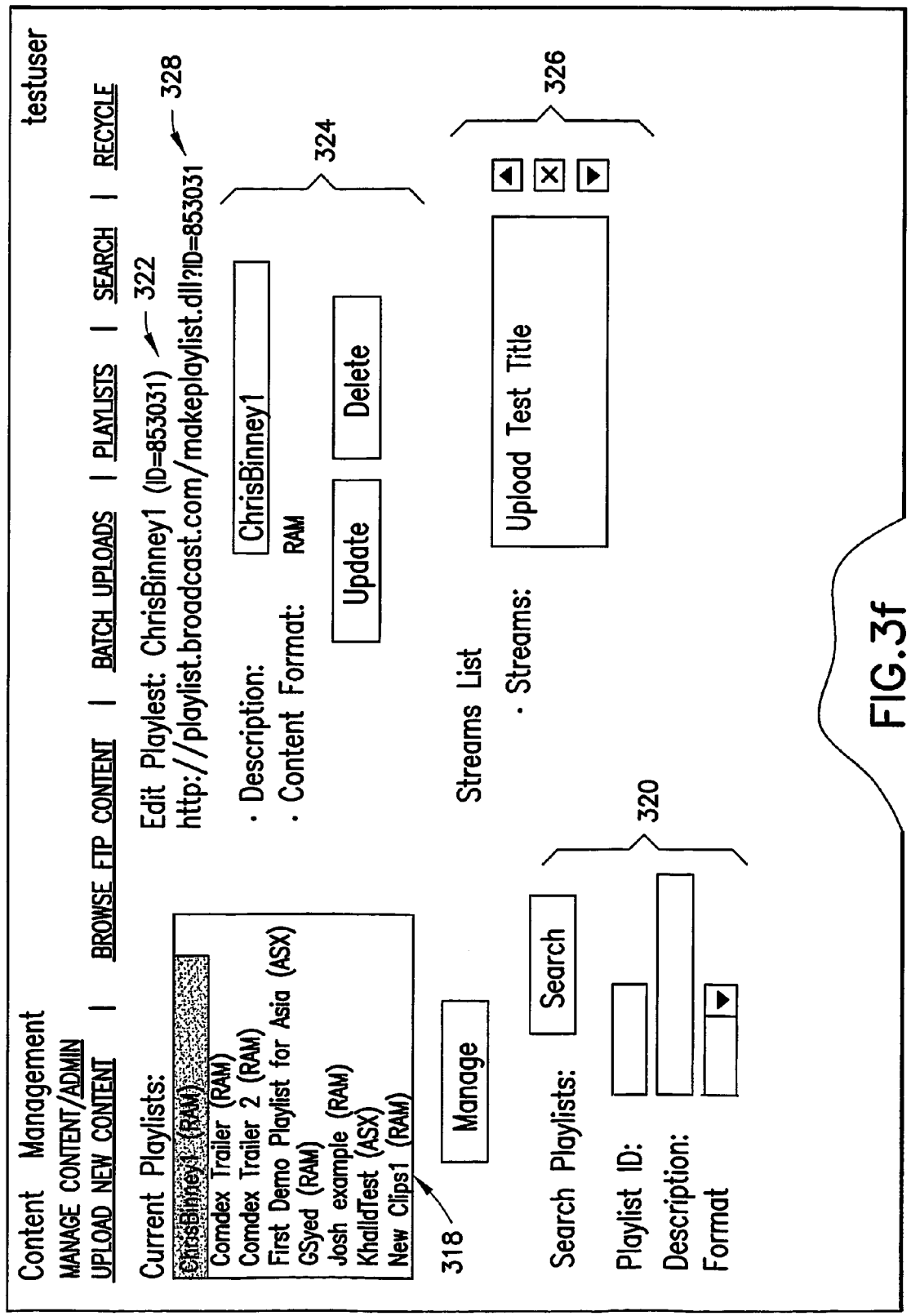

The client 102 may also select a current playlist to manage. As shown in FIG. 3*f*, when the client 102 chooses to manage a playlist, the system retrieves from the CM database 318 the CG id 322, various playlist details 324 as stored in the Content Group Table 224, and a list of streams or content files making up the identified playlist 326 as retrieved from the Content Group Streams Table 226 based on the CG ID. From the list of streams, the client 102 may select any number for deletion from the playlist, in which case the system removes the stream's id from the corresponding record in the Content Group Streams Table 226.

Notably, the web page also provides the client 102 with the uniform resource locator (URL) for the playlist 328. In general, the playlist URL 328 is incorporated into the client's web page as a link, and when activated by an end user 104, causes the playlist identified by the embedded playlist/CG ID to be played. The process of generating the playlist URL 328 and playing the streams associated with the playlist is described in greater detail with reference to FIG. 5.

The web page displayed when the client 102 selects the "search" option is shown in FIG. 3*g*. The system provides the client 102 with a search form 330 that enables the client 102 to enter the file details, including title, author, keywords, stream id, creation date, and duration, as search criteria. The web server 110 passes the file details entered by the client 102 to the script processor 116, which uses the values to search the CM Assets Table 212, CM Stream Keywords Table 216 and the Streams2 Table 214. The script processor 116, in return, returns various file details of the client's content files meeting the search criteria. Such results are shown in FIG. 3*h*. The search form 330 also includes an option to display the results in XML format (as received from the script processor 116)

and to search not only the client's current account, but also all child accounts (as indicated by the parent id field in the CM Accounts Table 210).

As an alternative to using the search form 330, the client 102 may simply browse all content in its content management account by, clicking the "Browse" button. Once the client 102 clicks the browse button, the web server calls a script on the script processor 116 that retrieves all files associated with the client's username and password (and, thus, account id).

Exemplary search results are illustrated in FIG. 3h. Each content file may be identified by any of the file details stored in the CM Database 118. In the present embodiment, each file is identified by the stream ID, title, stream type, stream description, creation date, file size, and status, all of which are stored in the CM Assets Table 212 and Streams2 Table 214.

Figure 3I:
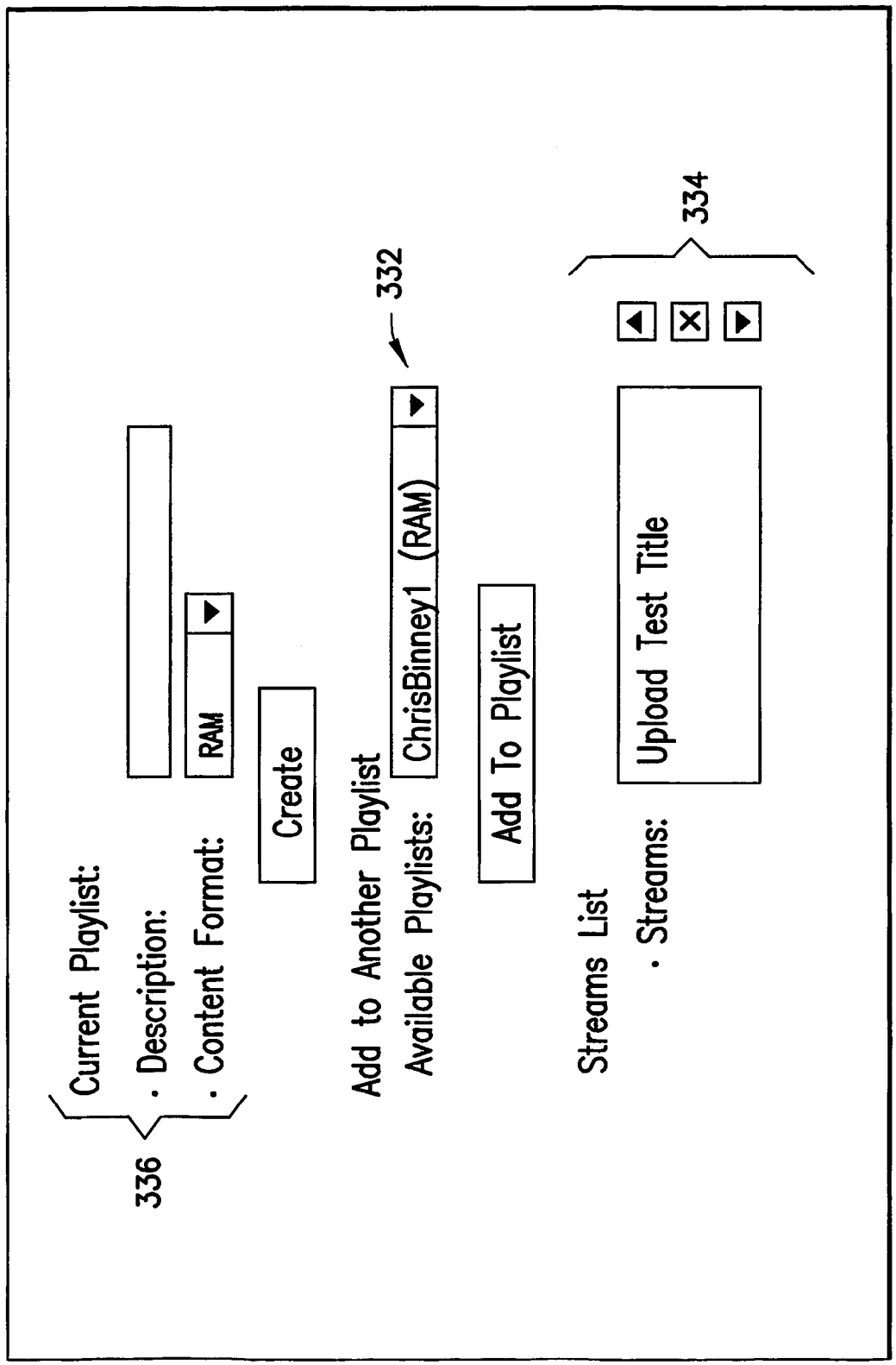

Furthermore, the web page displaying the search and browse results (FIG. 3h) provides the client 102 the option to select one or more files and either "delete" the selected files or "create a playlist" by adding the selected files to a new or existing playlist. In an alternate embodiment, clients 102 are also provided with the option to view the streams URL playlist URL 328. In the event the "create a playlist" button is activated, the "create a playlist" window shown in FIG. 3i is displayed. The window displays a list of the client's existing playlists 332 and the files contained within each playlist 334 (as provided in the "playlist" web page), and the window provides the client 102 a form 336 to enter playlist details, including description and format, for a playlist to be created using the files selected on the web page of FIG. 3h.

It should be understood that the foregoing client web pages represent an exemplary client interface and that other interfaces are within the scope of the present invention. For example, clients may access their account via a script, such as a virtual basic script, on an active server page (ASP), and pass the relevant variable in a query string rather than entering them on a web page.

Thus, in certain embodiments clients 102 are able to manage playlists via an ASP page running on one of the system servers (e.g., the web server 210 or a separate application server, not shown) by passing certain variables on a query string. In one such embodiment, the client 102 log into the system by paring its username and password and preferably as part of the same query string, passes any of a number of parameters depending upon the desired function.

For example, the client may pass a parameter specifying what action is to be performed on the playlist. Such action may include: adding or creating a new playlist; editing the playlist (e.g., editing the playlist parameters or streams comprising the playlist); removing or deleting the playlist; listing playlist in the account (e.g., by name or ID); listing the playlists and the contents of each playlist and the like. The playlist ID parameter is specified to identify the playlist on which the system is to act.

By way of example, playlist parameter that can be specified (and thus edited in the CM Database 118 is the name of the playlist. The playlist name can also be used to identify the playlist which the system is to act. Another parameter that can be specified, and thus edited) is the playlist format (e.g., RAM for RealMedia content and ASX for Windows Media content).

The client can also pass parameters specifying the action to be taken, if any, on individual streams comprising the specified playlist. Such actions may include, for example: adding a stream to the playlist; removing a stream from the playlist; removing all streams from the playlist; one or more stream IDs, to identifying the steam(s) when adding or removing them.

Preferably, under a client uses such an ASP to manage playlists, the server returns a message, such as an XML message, indicating whether the requested action was successfully performed and, if so, any information generated, much as the playlist ID of a newly created playlist. In the event the requested action was not successfully performed, the server responds with a error message identifying the error.

Uploading Content

As an initial matter, the system must identify the server to which a client's content should be uploaded. The site id is used to identify to which server a particular client's content should be uploaded, copied or moved. Specifically, once a client 102 logs into the system by providing its username and password, the system can identify the client's record in the CM Accounts Table 210, which provides the client's site id. Based on the site id, the system searches the CM Archive Volume Table 220 and identifies all records having the client's site id. Each of these records identifies a different server associated with the client's site id. If the system needs to access the FTP server 108 for the client (either to read the contents of or transfer a file to or from the client's account), the system identifies those CM Archive Volume Table records having the site id and a volume type corresponding to "FTP". Similarly, the system can identify repository servers 104 and streaming servers 120 associated with the client's site id by identifying those CM Archive Volume Table records having a type corresponding to "Repository" and "Streaming/Archive", respectively.

Figure 4A:
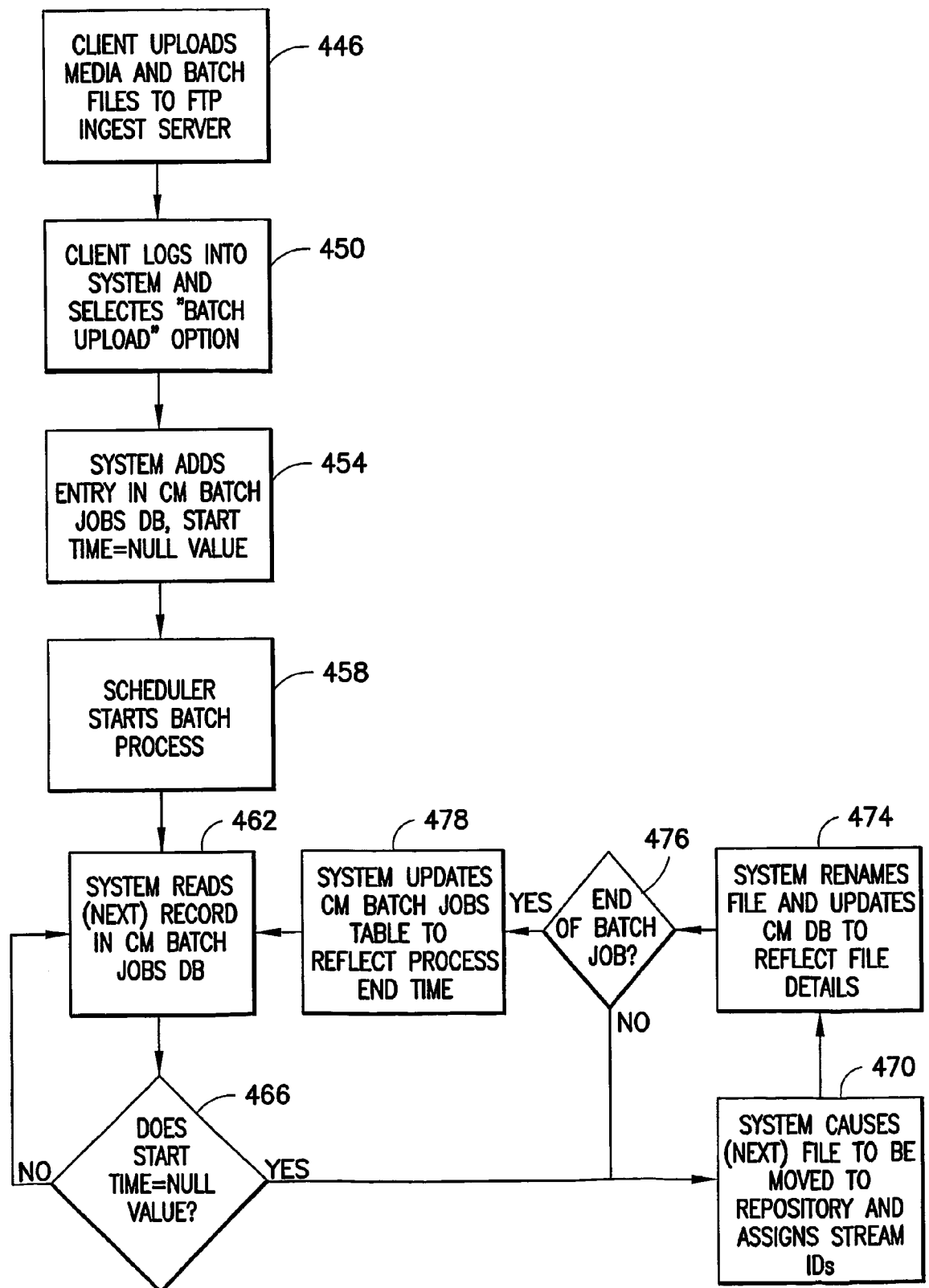
FIGS. 4*a-b* are flowcharts illustrating processes of uploading content files into the content management system according to one embodiment of the present invention.

As described with reference to FIGS. 4a-b, the system of the present embodiment allows the client 102 to upload content to the repository servers 106 by any of several different processes. The first processes (described with reference to FIGS. 4a and b) transfer content files from the client's FTP account on the FTP server 108 to a repository server 106. As such, the first step in these processes is the client 102 uploading content to the FTP server 108 as noted above. The last manner is from the client's machine to a repository server 106 via HTTP upload.

Figure 4B:
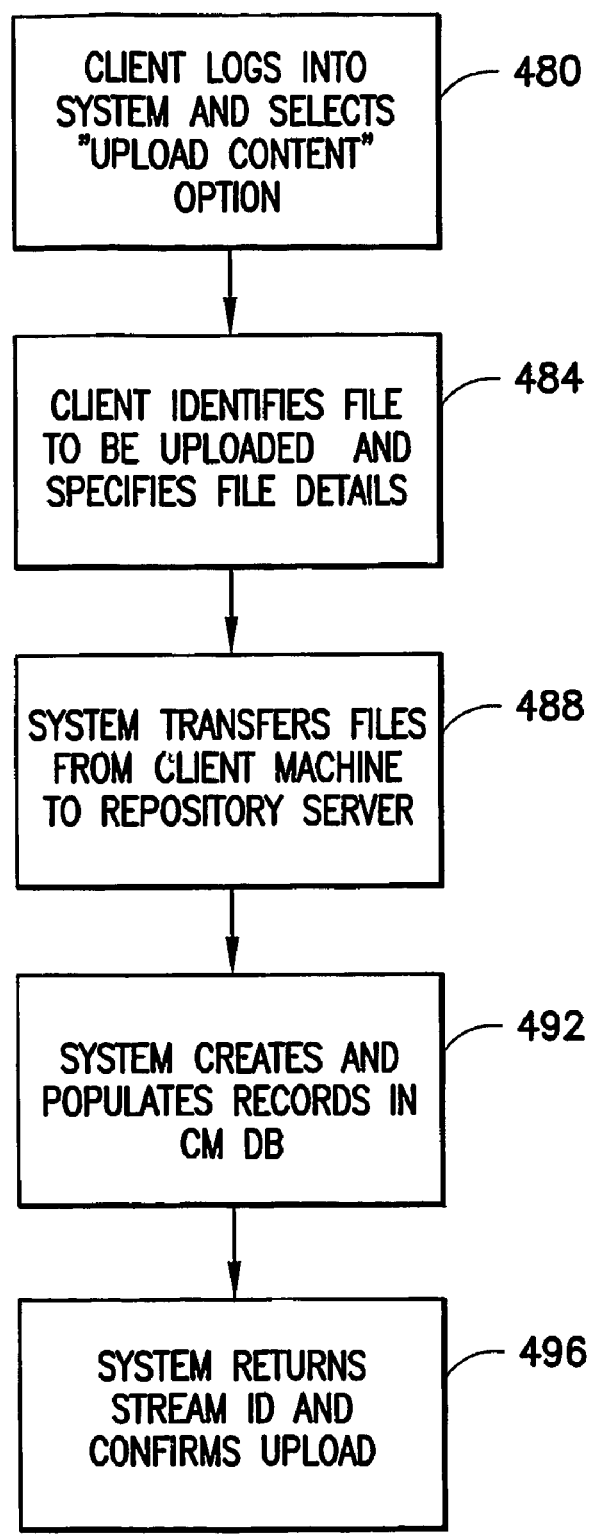

As an initial step in the HTTP upload process of FIG. 4b, the client 102 logs onto a web page provided by the client web server 110 by entering the client's user name and password. Having logged onto the system, the client then selects the "Upload New Content" option presented on the CM web page and identifies the content file locally stored on the client's machine that the client 102 desires to upload. Step 480. As illustrated in FIG. 3b, the client 102 has the option of identifying the file by file name or by clicking the "Browse" button, which opens a window listing the client's locally stored files. Additionally, the client 102 specifies at least required file details for inclusion in the CM Database 118. Step 484. The client web server 110 proceeds to transfer the file from the client's machine onto the repository server 106 via an HTTP upload. Step 488. The system assigns a stream id to the file and creates a record in each of the CM Assets Table 212, Streams2 Table 214 and CM Stream Keywords Table 216, and the system assigns a location id and creates a record in the CM Assets Location Table 218. Step 492. The client web server 110 proceeds to write the file details, as provided by the client 102, into the appropriate fields in the CM Database 118. Finally, the system returns the stream id to the client 102, which is displayed on the CM web page with a confirmation message. Step 496. In the event any of the foregoing steps fails, the system notifies the client 102 via a message on the CM web page.

Clients 102 may also programmatically upload content from their FTP Account on the FTP server 108 to a repository server 106 by executing a script. It is to be understood that although the following embodiment utilizes a Virtual Basic ("VBS") script on an active server page (ASP) of the web server 110, the functionality described may be implemented using any programming language such as Java Script.

As an initial step in the programmatic upload and ingest process, the client 102 uploads one or more files to the FTP ingest server 108 utilizing FTP client software residing on the client's machine. Once the files have been uploaded, the client 102 may use the ASP and pass certain variables on a query string to cause a file to be ingested or to perform another content management function.

As part of the ingest request of the present embodiment, the client 102 must enter its user name and password, as well as certain file details. Required file details include the name of the file in the client's FTP directory ("Filename"), the bit rate of the file ("Bitrate"), the title of the file ("Title"), and the author of the file ("Author").

The following optional file details may also be provided by the client 102 depending on the desired action: the copyright notice to be added to the content file ("Copyright"), a description of the file ("Description"), key words associated with the file to be used in searches ("Keywords"), an indication as to whether or not the file is secure ("IsSecure"), an alphanumeric security string for use in accessing the file if it is identified as being secure ("SecKey"), the security interval, the description of an existing playlist in the client's account ("PlaylistDesc"), an indication whether to add the file to the playlist identified by the aforementioned description or to replace the existing files associated with the aforementioned playlist with the file being ingested ("PlaylistAction"), Playlist ID (CGID) and an indication whether to automatically place the ingested file on a suitable streaming media server 120 or to only place the ingested file onto a repository server 106, where it will stay until the administrative staff manually causes the file to be placed on a streaming media server 120 ("AutoArchive"). In short, any stored file detail may be specified. The process of adding and replacing files in a playlist is discussed in greater detail below.

It is to be understood that the aforementioned file details are merely exemplary and that other file details may be considered required or optional in alternate embodiments of the present invention. Furthermore, it is to be understood such file details may be manually entered by the client 102 when submitting the ingest request, or, in an embodiment of the system wherein the client 102 enters the file details upon uploading the content files to the FTP server 108, the system may automatically retrieve the file details from the CM Database 118 based on the client's selection of the file to be ingested.

In general, the query string or command line identifies the active server page script, the location of the script, and the variables being passed to the script, including the user name, password, required file details, and any optional variables. The following is one example of such a command line:

http://contentmgmt.broadcast.com/
vbs_script_ingest.asp?UserName=Foo&Password=Bar&
FileNamee=testfile.rm&BitRate=5600&Title=Test
File&Author=John Doe The foregoing exemplary command line passes the real media file "testfile.rm," which has a bit rate of 5600 kilobytes, is entitled "test file" and is authored by "John Doe." Furthermore, the client 102 is identified by the user name "Foo" and password "Bar." Such variables are passed to the script "Vbs_script_ingest.asp," located at "content mgtnt.broadcast.com."

The following exemplary command line logs in user "Foo" using the password "Bar," uploading the file "Testfile," giving the file a Title, Author, Copyright, Description, and Keywords.

http://contentmgmt.broadcast.com/
vbs_script_ingest.asp?username=Foo&Password=Bar&Title=Tes File&Author=Yahoo! Broascast&CopyRight=(c)2000 All Rights Reserved&Description= Testing T When the script is called, the system receives the file details and causes the identified file to be moved from the FTP ingest server 108 to a repository server 106. Based on whether the file was successfully uploaded, the system provides to the client 102 one of two XML strings. Such XML string includes a success code field (scode), a success code description (scode_Description) and, if the upload was successful, the stream ID.

Thus, if the file was not successfully uploaded, the following XML string is returned to the client 102, wherein an scode of "1" indicates a failure and the value of the scode_description indicates the reason for the failure (e.g., an invalid user-name).

<?xml version="1.0"?>
<response scode="1" scode_description="invalid user-name"/>

In the event that the file was successfully uploaded, the system returns the following XML string wherein the scode and scode_description indicate the successful upload <?xml version="1.0"?>
<response scode="0" scode_description="Success" stream_id="999999" />

The system then renames the file and updates the appropriate fields in the CM database 118. More specifically, with the Stream ID assigned to the file, a record is created in each of the CM Assets Table 212, Streams2 Table 214 and CM Stream Keywords Table 216. Additionally, a location id is assigned and a record is created in the CM Assets Locations Table 218.

As will now be described with reference to FIG. 4a, and continuing reference to FIG. 3d, the client 102 may also perform two types of batch uploads, thereby transferring files from the client's FTP account to a repository server 106. The two types of batch uploads will be referred to as "default" and "standard" uploading. In general, default batch uploading applies default file details contained in the batch file to an entire sub-directory of content files. On the other hand, the standard batch upload process applies file details contained within the batch file on a file by file basis.

As an initial step, the client uploads the media files and batch file to the FTP ingest server 108. Step 446. In the case of a default batch upload, the batch file must be placed in the root directory of the client's FTP account. In the case of the standard upload process, the batch file, along with the media files, are left in the root folder of the client's FTP account.

The format of the batch file also depends upon the type of batch upload. The default batch upload file takes on the following format wherein the file is first identified as being for use in a "DEFAULT" batch upload and the relevant file details are separated by double colons as follows:

DEFAULT::DIRECTORY::BITRATE::TITLE::AUTHOR::CQPYRIGHT::
DESCRIPTION::KEYWORDS::ISSECURE::SECURITYKEY::SECURITY INTERVAL

The default batch file also includes an indication of the FTP DIRECTORY where the content files to which the default file details are to be applied are located. In the event the client 102 does not wish to supply an optional file detail, the location for such file detail is simply left blank. Furthermore, by placing the word "FILENAME" in parenthesis in either the Title or Description field in the batch file, the system will automatically include the file's file name in such field. By way of example, the following default batch file will apply to all files in the client's FTP directory named "288_Filesdirectory," which contains filing have a bitrate of 2880 kilobytes, entitled "Upload," including the file name, authored by J. Doe, a copyright notice reading "Copyright©2001," no description and no keywords, an indication that the file is secure, having the security key "mysecuritykey," and having a security interval of 122 minutes.

DEFAULT::288_FILES::2880::Upload(FILENAME)::
        J.DOE::Copyright© 2001::::::Y::MY
    SECURITYKEY::122

The standard batch upload batch file includes the same file details, however, does not include the "DEFAULT" identifier or the "DIRECTORY" identifier. Instead, each line in the standard batch file begins with the file name to which the file detail set forth in that line are to be applied. As such, the following is the format of the standard batch file:

FILENAME::BITRATE::TITLE::AUTHOR::COPY-
        RIGHT::DESCRIPTION::KEYWORDS::
    ISSECURE::SECURITYKEY::SECURITYINTERVAL

Once the media files and the batch file is uploaded to the system, the client logs into the system via the CM website and selects the "Batch Upload" option, as shown in FIG. 3*d*. Step 450. As part of the process of selecting the Batch Upload option, the client 102 is presented with a list of both processes and unprocessed batch files. (See FIG. 3*d*). The client 102 selects an unprocessed batch file for processing.

Upon selecting a batch file for processing, the system executes a script that causes an entry to be created in the CM Batch Jobs Table 228. Step 454.

At some later point, according to a predefined interval, a task scheduler running on the script processor 116 causes a batch script to execute. Step 458. As described below, the batch script proceeds to read and process the unprocessed batch jobs identified in the CM Batch Jobs Table 228. In an alternate embodiment, processing of the batch files is not automated and instead is manually initiated by the administrative staff via the file management server 112.

Once the batch process is started, the system proceeds to read the first record in the CM Batch Jobs Table 228. Step 462. Specifically, the system reads the record to determine whether the start time field equals a null value or whether some actual start time. Step 466. If the start time field has an actual start time, then the batch process job has already been completed and the system proceeds to read the next record in the CM Batch Jobs Table 228. Step 462.

In the event that the start time value of the current record equals the null value, the system executes the batch job. Accordingly, the system causes the first file associated with the batch file to be moved to a repository server 106 and assigns the file a stream id. Step 470.

The system proceeds to rename the file that has been moved and updates the CM database 118 to reflect the associated file details provided by the batch file. Step 474. More specifically, the system parses the batch file based on the batch file format discussed above, inserting the file details into the CM Assets Table 212, Streams2 Table 214 and the CM Stream Keywords Table 216. The system also creates a record in the CM Asset Locations Table 218. Once the file details have been entered into the appropriate records in the CM database 118, the system determines whether or not all content files associated with the batch file have been moved. Step 476. In other words, the system determines whether the end of the batch job has been reached. If the end of the batch job has been reached, then the system updates the record in the CM Batch Jobs Table 228 by entering the process end time. Step 478. If the end of the batch job has not been reached, then the system proceeds to move the next file associated with the batch file, assign a stream id, and update the CM database 118 accordingly. Steps 470, 474. Once the system cycles through the CM Batch Jobs Table 228, the processing of the batch jobs ceases until the scheduler begins the batch process again.

Selecting The Streaming Media Server on Which to Place a Client's Content

In the present embodiment, the system places each client's content on the streaming media server 120 that has the most free disk or storage space. More specifically, the script processor 116 (or other server in alternate embodiments) reads the client's record in the CM Accounts Table 210, identifying the client's site id. Using the client's site id, the system searches the CM Archive Volume Table 220 and locates all records having a volume type indicating streaming/archive. From this group of records, the system identifies only those having a platform (e.g., Windows Media or Real Media) corresponding to the format of the content file being uploaded. The resulting records are all potential streaming media serves 120 on which the content could be uploaded.

For each of the servers identified by the remaining records (each record and volume id corresponds to one server), the system proceeds to determine the available storage capacity by subtracting the used capacity from the maximum capacity. Using the records identifying all potential streaming media servers 120, the system notes the maximum storage capacity of each such media server 120, as set forth in the "max kb" field of the CM Archive Volume Table 220. The system then calculates how much of that capacity is actually being used by summing the size of all files stored on each such media server 120. More specifically, for each volume id (server), the system identifies all of the records in the CM Asset Locations Table 218 having the same volume id and identifies the stream id's in each of those records. The result is a list of all files, as identified by stream id's, residing on the server 120 corresponding to the given volume id. The system reads and sums the files sizes by accessing the CM Assets Table 212. For each volume id, the system subtracts the total storage used by the files residing on the server having that volume id from the maximum storage capacity of the server, thereby calculating the actual available storage.

The content file being uploaded is placed on the streaming media server 120 (i.e., volume id) having the most available storage capacity. The system uses the selected volume id to create a new record in the CM Assets Locations Table 218 for the archived content file.

Creation of Playlist

Figure 5:
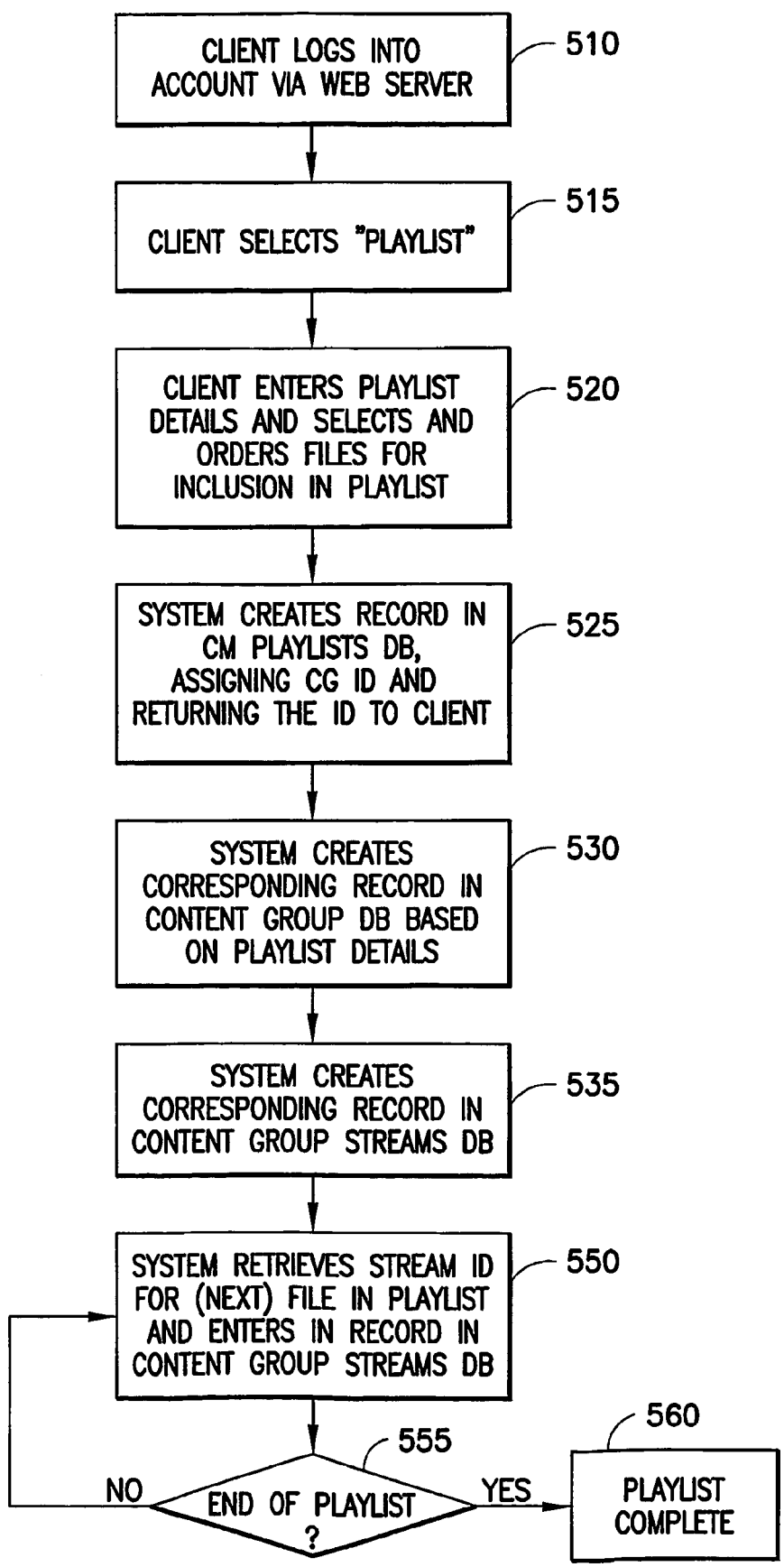
FIG. 5 is a flowchart illustrating the process of creating a playlist according to one embodiment of the present invention.

As will now be described with reference to FIG. 5, clients 102 may also programmatically create playlists in the CM Playlists Database. The client 102 logs into his/her account via the web server 110 and selects the "Playlist" link. Steps 510 and 515. The client 102 is presented with a form into which the client 102 enters playlist details, such as description and file format, and selects and orders stream files for inclusion in the playlist. Step 520. Once the client 102 has finished entering the playlist details, the system creates a new playlist record in the CM Playlists Database and assigns a CG ID to the playlist. This CG ID is returned to the client 102 for inclusion in the client's web site 102. Step 525. The system also creates corresponding records in both the CG Database and the CG Streams Database based upon the playlist details. Steps 530 and 535. Next, the system retrieves the stream ID for the next stream file in the playlist and enters the stream ID in a record in the CG Streams Database. Step 550. The system then queries whether the end of the playlist was reached. Step 555. If yes, then the system has completed creating records for the playlist. However, if more streams are found, the system loops back to Step 550 to create additional records.

In this way, the playlist details are stored on the CM Database 118 so as to be accessible by the playlist server 122 to dynamically generate playlist redirector files, as described below.

Dynamic Playlist Redirector Files Creation

Referring back to FIG. 1, the media servers 120 are connected to the world wide web, or some other global communications network, through the LAN. In this respect, streaming content is made available to end users 104 through the world wide web.

Upon completion of the scheduling and production phase of the web cast event, a uniform resource locator (URL) or link is returned to the client 102 to be embedded in the client's web page. An end user 104 desiring to listen to or view the web cast on their computer or other device can click on the URL. A playlist or CG ID (12345) is preferably embedded within the URL, as shown below:

<A href="http://playlistserver.company.com/makeplaylist.asp?id=12345">

In the illustrative URL shown above, the link points to the playlist server 122 that will execute the "makeplaylist.asp" program and dynamically generate a playlist redirector file. One skilled in the art will recognize that although the "makeplaylist" application has an Active Server Page (or ASP) extension, it is not necessary to use ASP technologies. Rather, any programming or scripting language or technology could be used to provide the desired functionality, for example, .dll. It is preferred, however, that the program run on the server side so as to alleviate any processing bottlenecks on the end user side.

The "makeplaylist" program functions to cause the playlist server 122 to make a call to the CM database 118 to retrieve the data necessary to dynamically generate the playlist redirector file. The playlist server 122 first accesses the CG Streams Table 226 and locates the record pertaining to the CG ID. As shown in FIG. 2, the CG Streams Table 226 contains the individual stream IDs and their respective sort orders. The stream IDs and the sort order are returned to the "makeplaylist" program which then makes a call to the Streams2 Tables 214 in the CM database 118 that contain data associated with the individual streams. Namely, the Streams2 Table 214 includes a URL prefix and a stream filename. The individual streams identifiers are also used by the "makeplaylist" program to call to the Stream-Servers Table 230 in the CM database 118. The Stream-Servers Table 230 includes the location or (DNS) hostname of the particular media server 120 containing the stream file associated with a particular stream identifier. Using the URL prefix, the hostname, and the stream filename, the "makeplaylist" dynamically generates a URL for each stream file. An example of such a URL is listed below, wherein the URL prefix is "mms://", the hostname is "mediaserver.company.com" and the stream file name is "filename.asf.":

<"mms://mediaserver.company.com/filename.asf">

Using the individual stream URLs, the "makeplaylist" program then dynamically generates a redirector file to be passed to the media player stored on the end user's computer 104. An example of a redirector file for use with Windows Media Technologies (WMT) is shown below:

<ASX>
  <ENTRY>
    <REF HREF="mms://mediaserver.company.com/stream1.asf">
    <REF HREF="mms://mediaserver.company.com/stream2.asf">
    <REF HREF="mms://mediaserver.company.com/stream3.asf">
  </ENTRY>
</ASX>

One skilled in the art will recognize, of course, that different media technologies utilize different formats of redirector files and, therefore, the term "redirector file" is not limited to the ASX-type file shown above. Lastly, the end user's media player pulls each identified stream file from the media server 120 identified in the redirector file in the order in which it appears in the file.

It is to be understood that other system architectures are within the scope of the present invention. For example, certain embodiments include sites each having its servers on a separate LAN coupled to the administrative components (e.g., playlist server, file management server, script processor, database) via a secure SMTP connection. Furthermore, certain embodiments do not, as in the embodiment of FIG. 1, include repository servers that maintain backed up copies of files. One such embodiment that does not include repository servers for storing backups will now be described with reference to the schematic of FIG. 6, the workflow diagram of FIG. 7 and the CM Database schematic of FIG. 8.

Figure 6:
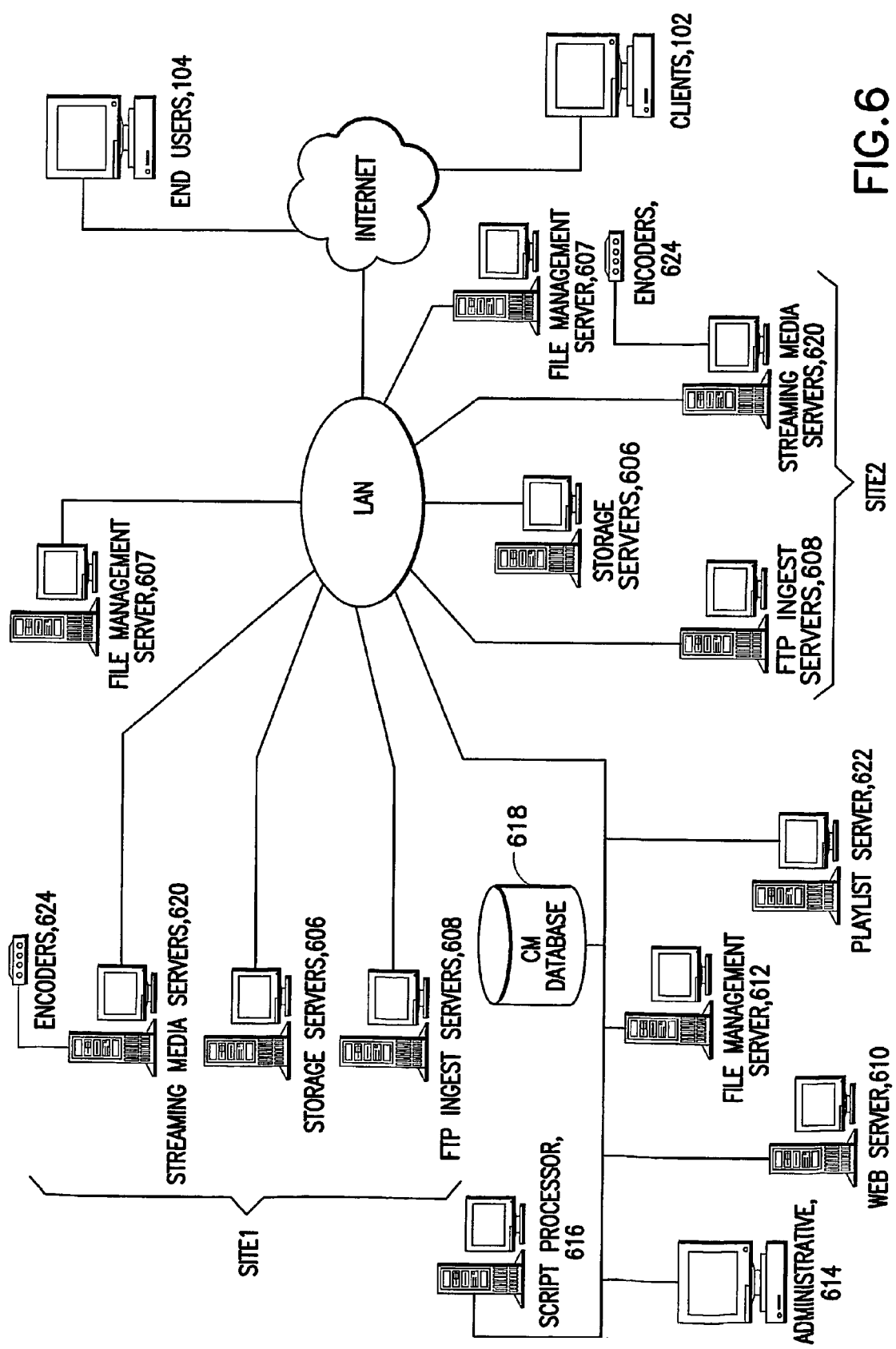
FIG. 6 is a schematic illustrating the system architecture of an alternate embodiment of the present invention.

As illustrated in FIG. 6, the architecture of the present embodiment essentially mirrors that of the embodiment of FIG. 1. Indeed, the operation of the components illustrated therein is based on, and in many respects identical to the components described above with reference to FIG. 1. However, rather than including repository servers for maintaining a backup of content stored on the streaming media servers, the present embodiment includes storage servers 606 that maintain a copy of each item of content to the exclusion of maintaining a duplicate copy on a streaming media server 620. In short, other than an external backup, such as on a tape backup system or mirror or redundant disk system, preferably the only copy of each item of content for a given site is on the storage servers 606. Accordingly, as described in greater detail below, when providing access to the content, the streaming media servers 620 performs a LAN based read of the appropriate content on the storage servers 606.

It should be appreciated that coupling multiple media servers 620 to a single storage server 606 having the only copy (vis-à-vis those media servers 620) provides several benefits. For example, the content management service provide saves money because less storage is used. Additionally, because multiple media servers 620 may access and, thus, stream the same item of content, clients 102 will encounter fewer instances of end users 104 not being able to receive the content because a media server 620 is already providing the maximum number of streams. While so utilizing the storage servers 606 and media servers 620 is preferable, it is within the scope of the present invention to have some sites employ an architecture wherein a repository or backup server and the media server each has a copy of the content, and have other sites employ a architecture where media servers do not have a copy of the content.

Unlike the embodiment of FIG. 1, the present embodiment also includes site specific file manipulation servers 607. As described in greater detail below, each such file manipulation server 607 causes files to be moved from each site specific FTP ingest server 608 to the appropriate storage server 606.

It is also within the scope of the invention to have one or more sites in the present embodiment on separate networks in communication with the administrative servers and processors via SMTP or other connection, which themselves may be on a separate network.

Figure 7:
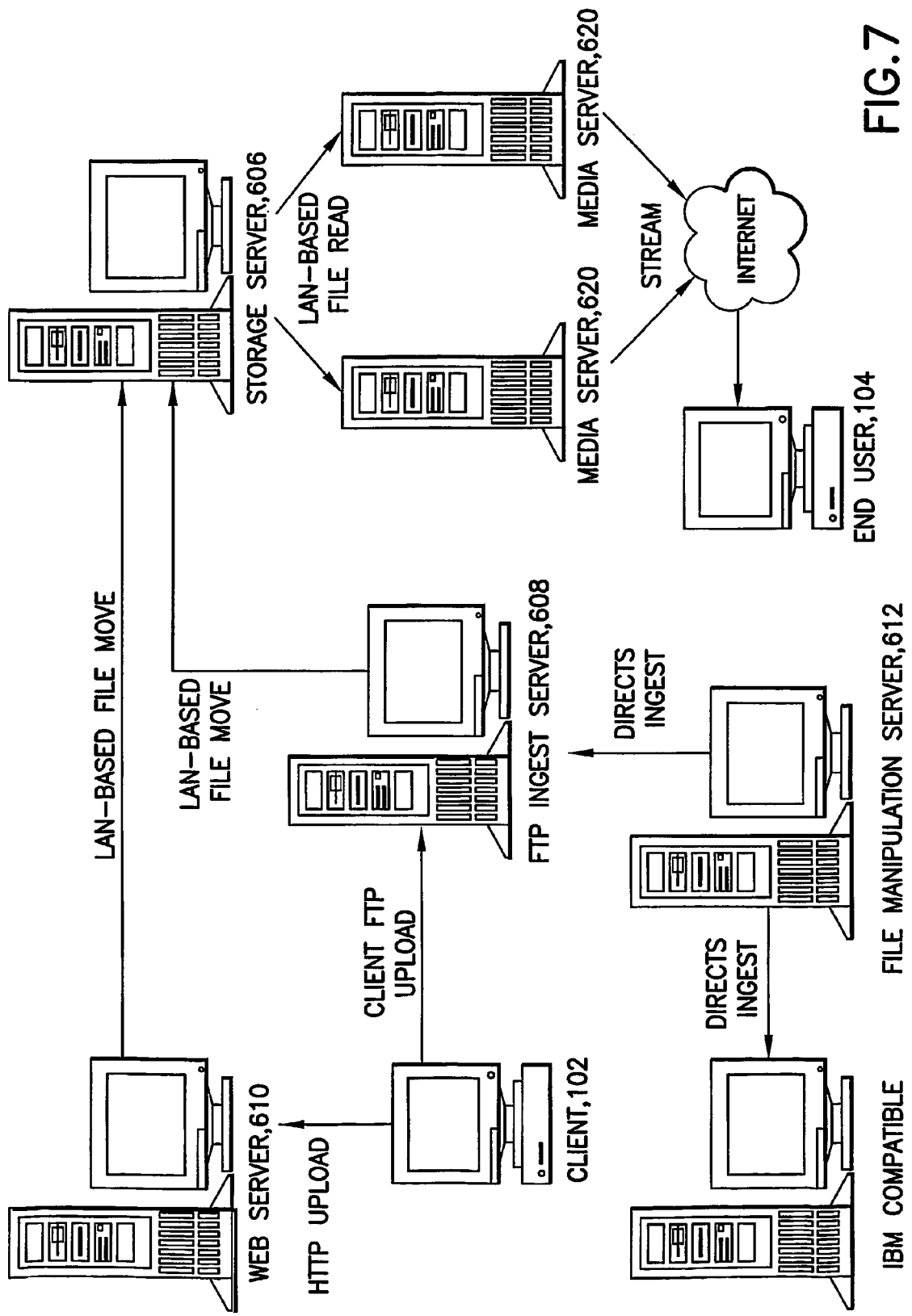
FIG. 7 is a schematic illustrating a workflow of a content management system according to the alternate embodiment of FIG. 6.
Figure 8A:
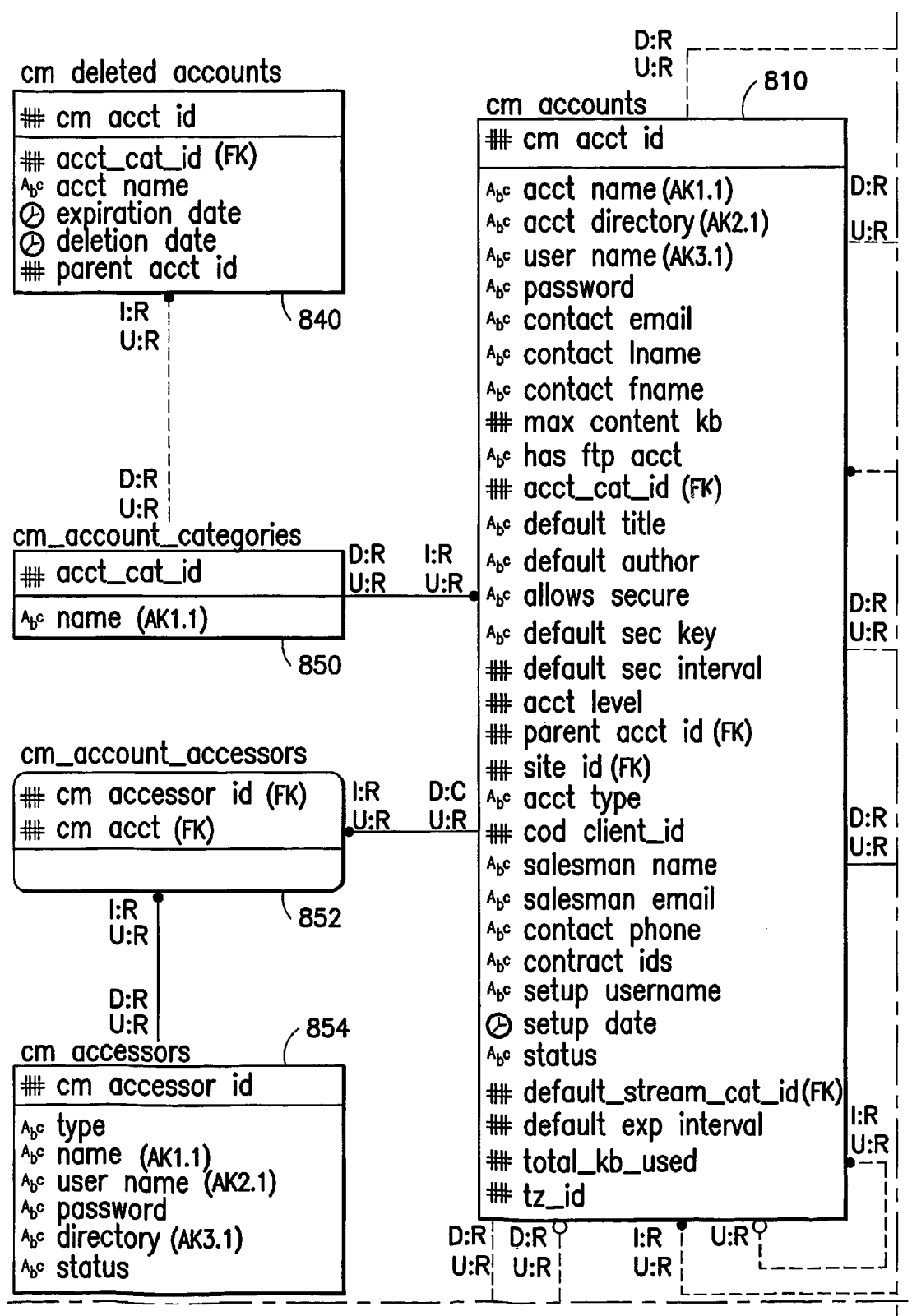
Figure 8B:
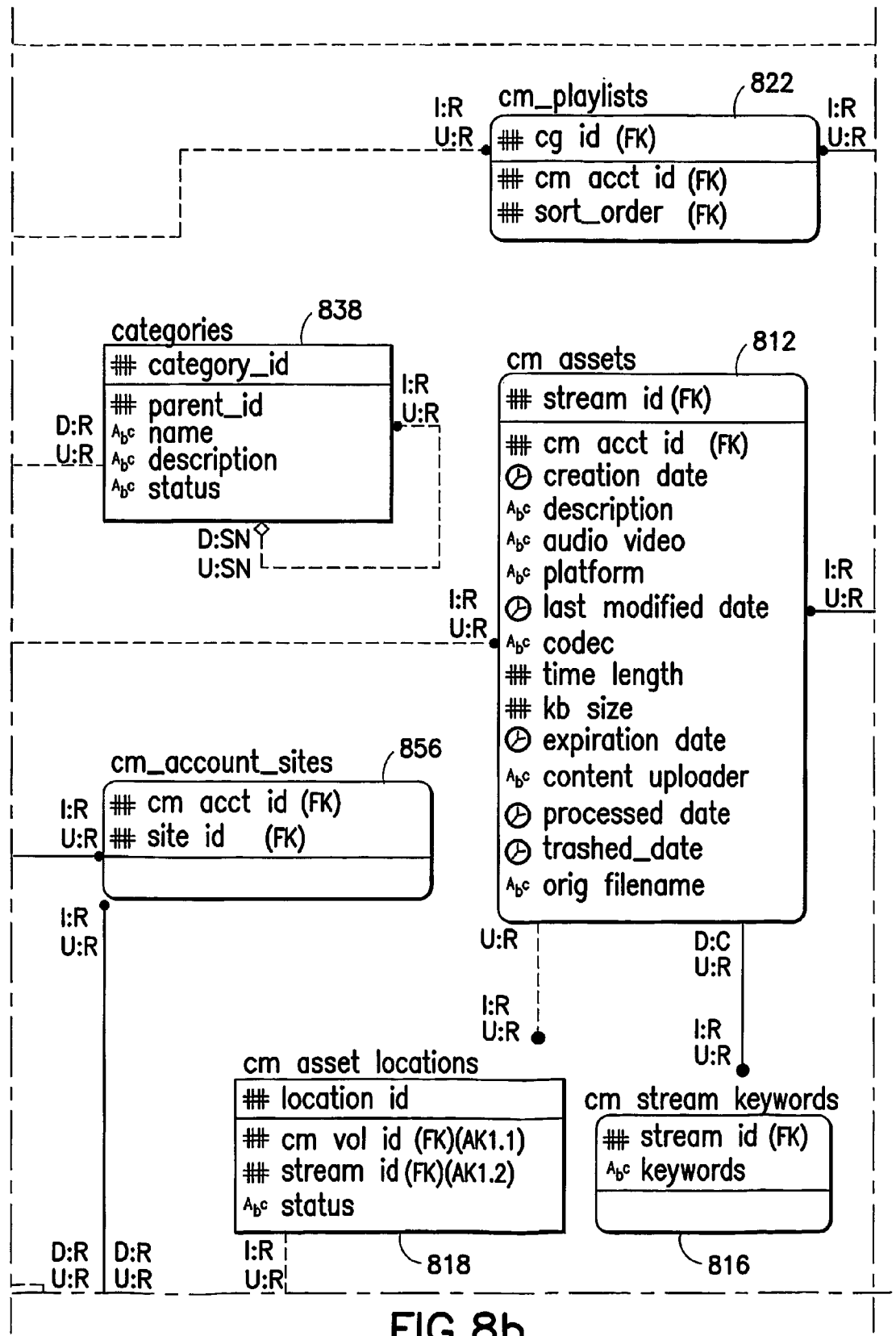
Figure 8C:
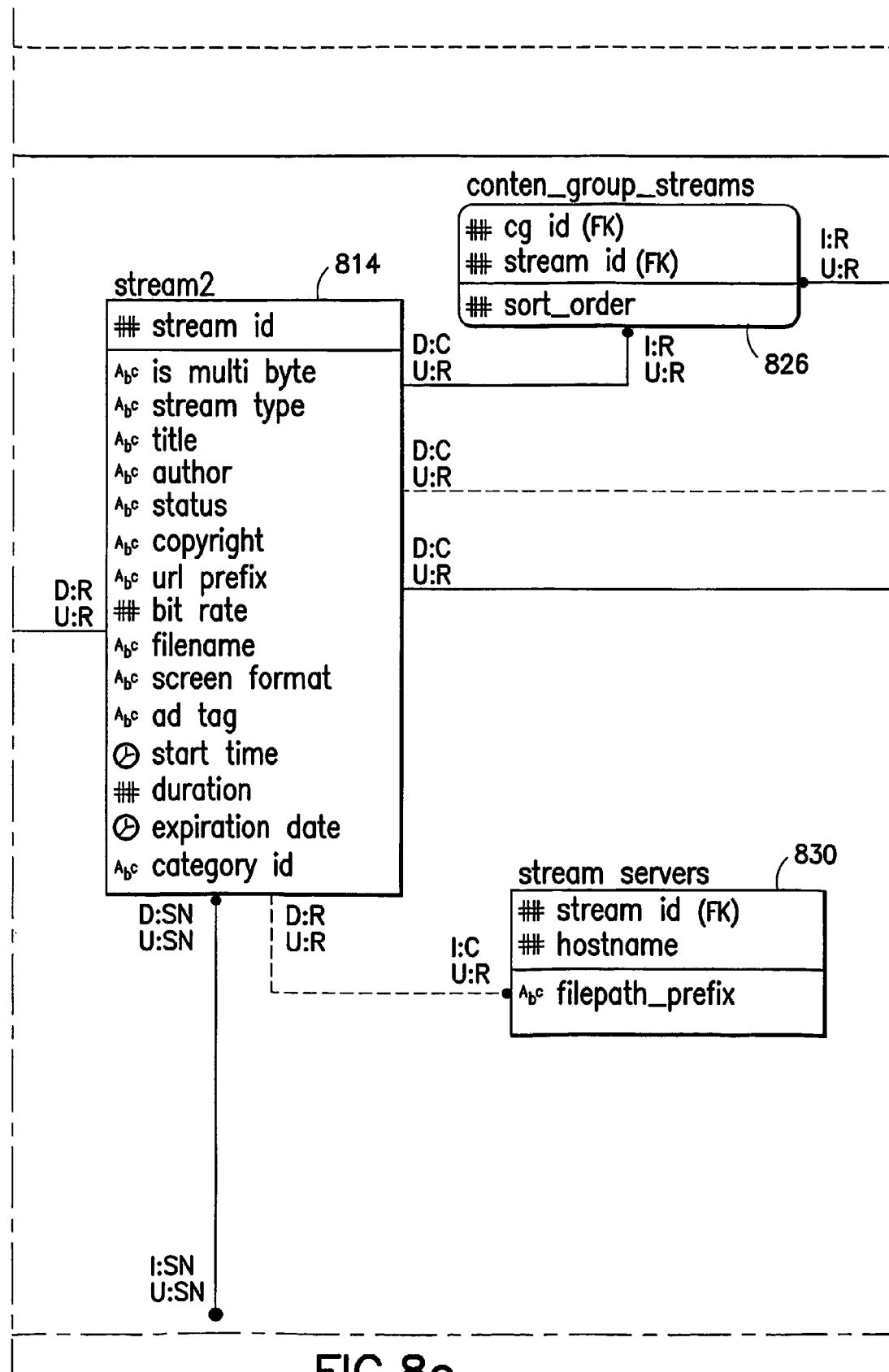
Figure 8D:
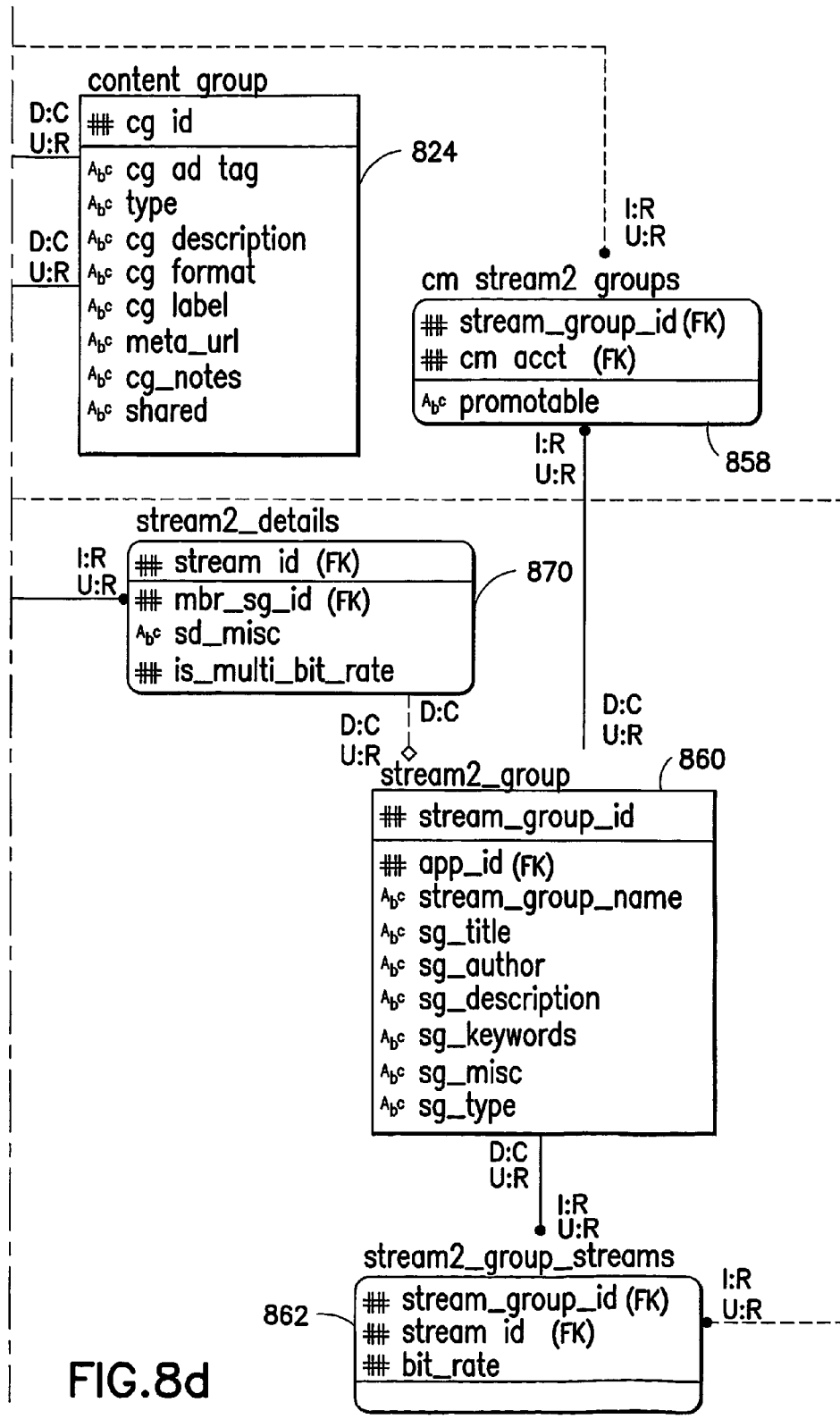
Figure 8F:
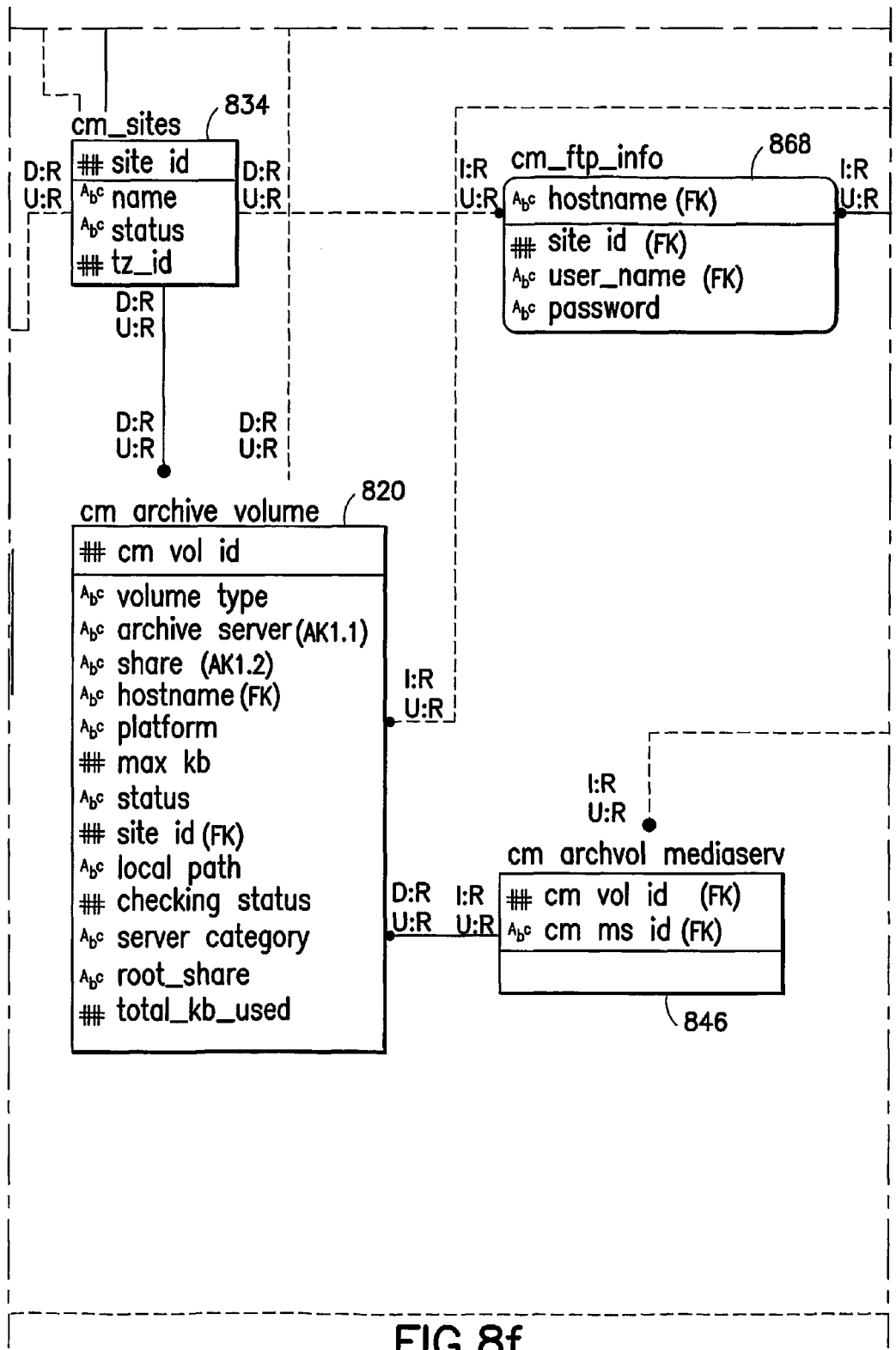
Figure 8G:
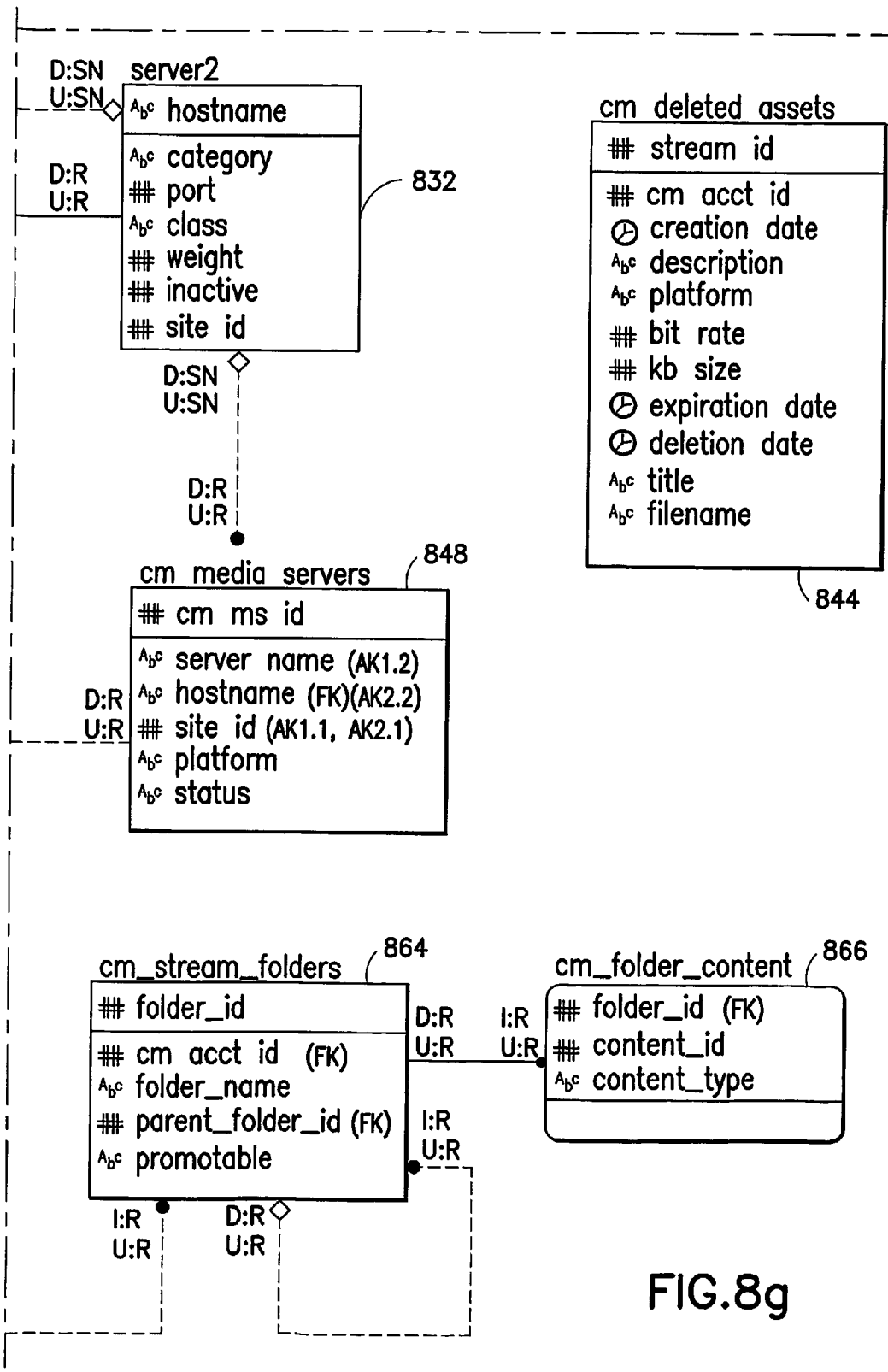

Having described the architecture of the present embodiment, its general operation will now be described with reference to the workflow diagram of FIG. 7. It is to be understood, however, that aside from the differences noted or otherwise to be understood based on the following description, the components of the present embodiment operate as like named components of the embodiment of FIG. 1. As illustrated therein, clients 102 are able to upload content either via an HTTP upload to the web server 610 or via an FTP upload to the client's primary site, as identified in the client's account record in the CM database 618. The web server 610, in turn, performs a LAN-based file move to the appropriate storage server 606. In alternate embodiments, the read is via a direct, point to point connection. Under direction of the file management server 612, each site specific file manipulation server 607 causes the content previously uploaded to the FTP ingest server 608 to be moved via the LAN to the appropriate storage server 606.

With the content stored on the appropriate storage server 606, each streaming media server 620 receiving a request for content will read the file from the appropriate storage server 606 (in the present embodiment, via a LAN based file read) to obtain the content and ultimately provide it to the end user 104 requesting it.

Because the functionality of the present embodiment, in large part, parallels that of the embodiment of FIG. 1, the CM database 618 illustrated in FIG. 8, largely parallels the CM database 118 of FIG. 2, with similarly named tables and fields providing similar functionality and storing similar information unless stated or understood otherwise. However, the present CM database 618 includes variations to accommodate the use of storage servers 606, as well as to provide additional functionality. Such variations and additional functionality will now be described with reference to the database schematic of FIG. 8 and continuing reference to the schematic of FIG. 6.

Multiple Media Servers Per Storage Server

As noted above, an item of content stored on a storage server 608 is accessed by each media server 620 that provides an end user 104 access to such content. Furthermore, in the present embodiment, multiple media server 620 may access a given item of content on a storage server 608. Consequently, the CM database 618 tracks which one or more media servers 620 are coupled to, and may access, a given storage server 608. To accommodate this potential one to many relationship, the CM database 618 includes the archive volume media server ("AVMS") Table 846 and the Media Servers Table 848. Each record in the AVMS Table 846 associates a volume ID with a media server, as identified by media server (MS) ID, that is permitted to access content stored at the volume ID. Each MS ID, in turn, corresponds to a record in the Media Servers Table 848, which provides media server identifying information, as indicated. The "status" column stores one of the following values: CE (Check Enabled); MD (Manually Disabled); and ME (Manually Enabled).

As with the prior embodiment, each volume ID is essentially defined in a record in the Archive Volume Table 820. The volume type field in the archive volume table 820 specifies to which type of server (FTP ingest server file manipulation server, storage server, or web server) the volume ID corresponds. The server category field identifies the server as being used for business services or public services or any other category useful for reporting and maintenance purposes. The platform field is used to identify the media platform corresponding to the volume type or to indicate that the platform is not applicable or to indicate all platforms (e.g., a character such as "B").

The "archive server" field (in Archive Volume Table 820), and the "server name" field (in the Media Servers Table) store the computer's WINS/NETBIOS name for LAN based file access (for example, PUB01), so that shared resources (such as directories, etc.) on the server can be accessed via that name (for example, \\PUB01\PRoot1).

The present embodiment has various other features reflected in the CM database 618. For example, as illustrated in the Accounts Table 810, each account is associated with an account category, as identified by account category ID (acct cat ID). Each account category ID corresponds to an entry in the Account Categories Table 850, which sets forth the name of the category. In general, an account category refers to a type of account, such as Internet radio or television or corporate account. The content management service provider may use such information for reporting and, because accounts can be segregated into broad categories, for simplifying the searching of accounts.

Time Zones

The Accounts Table 810 also includes a time zone ID field (TZ ID), which identifies a client selectable time zone. Based on the client's selection, and the corresponding time zone ID, all information presented to the client 102 is based on the selected time zone. More specifically, the date and time field stored within the data base 618 are stored in a Greenwich meantime, however prior to being displayed to each client 102, the system converts the time into that of the client selected time zone. Similarly, dates and times entered by each client 102 is converted to Greenwich Mean Time prior to being stored in the database 618. In the present embodiment, each time zone ID corresponds to a record in a time zone table (not shown), identifying the time zone and providing the relative difference between the Greenwich Mean Time and that time zone. Thus, by way of example, the expiration date, deletion date, creation date and any other time related information is presented in the Client's selected time zone frame.

Default Expiration Interval

The Accounts Table 810 also includes a default expiration interval field (default exp interval). In the event a client 102 fails to specify an expiration date for a particular file being uploaded, the system automatically adds the value stored (e.g., minutes hours, days, weeks, and the like) in the default expiration interval field to the date and time that the file is uploaded, thereby arriving at the default expiration date for the file. Such default expiration interval may be set by the client 102 during registration, or at any other point in the process.

Accessors

The current embodiment also includes tables that specify who may access and alter account information. Specifically, the Account Accessors Table 852 and the Accessors Table 854 specify, for each account ID, one or more individuals (accessors) that may access the account. As illustrated, there may be several records in the account accessors table 852 for each account ID, thereby specifying multiple accessors for each account. Such accessors may be individuals external to the content management system and internal to the client 102, or administrative personnel (internal to the service provider).

Stream Categories

Unlike the embodiment of FIG. 2, the Streams2 Table 814 includes a field specifying each stream's category (category ID). Stream categories are essentially any type or division of content deemed helpful to the content management service provider or the clients 102. Furthermore, categories may be a broad or as focused as desired. In the present embodiment, stream categories are hierarchical in nature, with only the most detailed category being assignable to a stream. For example, the system may provide a first level category of "sports," with a second level of multiple subcategories, such as "baseball," "basketball," "football," and the like. Each subcategory, in turn, includes more detailed third level of subcategories, for example, under basketball, could be "NBA," "WBA" and "College." Only these most detailed categories are assignable in the present embodiment.

Preferably, each client 102 specifies a default stream category to be applied to uploaded streams that is stored in the Account Table 810 (in the default stream cat ID field). When new content is uploaded via the client web site or programmatically, the client 102 has the option of using the default category or supplying a new category. In either case, the system creates a new record in the Streams2 Table 814 and populates the category ID field accordingly.

Each category ID corresponds to an entry in the Categories Table 838, which specifies the name of the category, the parent category of the subject category, the type of category (i.e., whether the category is assignable or not) and the level of the category in the category hierarchy. This system retrieves this information and constructs a visual display of the hierarchy on the client side web page and permits each client to select the desired category. The Categories Table 838 is also keyed to the default category ID in the Account Table 810.

Replication Sites

The present embodiment also allows each client 102 to have multiple sites—a primary site and one or more replication sites associated with its account. In general, when uploading content via the client website, the client 102 may specify any one or more of the replication sites to which the content will be uploaded (in addition to the primary site). The client's primary site is identified by the site ID stored in the client's record in the Account Table 810. The replication sites are identified in the Account Sites Table 856. More specifically, the Account Sites Table 856 includes records that associate multiple site IDs to the client's account ID. Of course, there is no requirement that a particular account have any replication sites associated therewith.

In operation, when a client 102 uploads content, the content gets passed to the storage server 606 associated with the client's primary site. As with the previous embodiment the stream ID assigned to the content gets returned to the client 102. Thus, in the context of the process of FIG. 4b, an additional step 486 would be performed, namely, that if the client 102 is authorized to replicate its content to any site other than their primary site, the client optionally selects one or more replication sites to which the file being uploaded should be replicated.

In the background, when the client 102 uploads the content and identifies a replication site to which the content should be stored, an entry is made in a replication queue with the information identifying the content and the storage server 606 of the replication site. Periodically, a script checks the replication queue for entries and, for each entry in the queue, causes the appropriate content to be stored in the specified storage server 606 corresponding to the replication site. Thus, in the context of the process of FIG. 4b, step 498 would be added to account for the system replicating the files to replication sites if one or more replication sites were chosen by the client while specifying file details. It should be noted that for each storage server 606 containing a copy of the content, there is a record in the Assets Location Table 818, each corresponding to the same stream ID and file name. This stream ID, universal to all copies of the file at the primary and replication sites, simplifies management of the copies, as there is only one entry in the Assets Table 812.

The ability to replicate content and the lack of a back up copy of each item of content on a repository server, as in the embodiment of FIG. 2, results in certain changes in the Asset Locations Table 818 status field. More specifically, the status is never "backing-up" and, instead, may indicate that the content is: available; being deleted; has expired; failed to be properly stored; being moved; new; being trashed; or being replicated, as described above. Notably, in the present embodiment, there is no need to copy a content file from one storage server 606 to another within the same site because multiple media servers 620 can access the content.

Recycle Bin

The status of being "trashed" is used in conjunction with a figurative "recycle bin," like that describe above with reference to FIG. 3j. When browsing or searching content, a client 102 may select one or more items of content for deletion, or placement in the recycle bin. When selected for deletion, the system changes the value of the status field for the corresponding record in the Asset Locations Table 818 to "trashed." The system also creates a record in the Deleted Assets Table 844 and enters as the deletion date a date (and time) some predetermined period in the future (e.g., one day, one week). A script running on the script processor or other server periodically searches (e.g., every three hours; every day; and the like) for records in the Asset Locations Table 818 having a status of "trashed." For each such record, the system locates the corresponding record in the Deleted Assets Table 844 and reads the deletion date. If the deletion date equals or is greater than (i.e., after the then current date (and time), then the system proceeds to delete the content. Until such time as the content is actually deleted, the client 102 may restore the content from the recycle bin via a web page identifying the contents (or, in alternate embodiments, programmatically). When the client 102 selects an item of content for restoration, the system changes the status in the Asset Locations Table 818 from "trashed" back to "available" and deletes the record in the Deleted Assets Table 844.

Stream Groups

The present embodiment also allows clients 102 to logically group Streams into stream groups for ease of presentation to end users 104. More specifically, each logical stream group includes content files having the same susceptive content, but different media formats and/or bit rates. When a client 102 uploads content, the client web page presents the client 102 with the option of associating the uploaded content with an existing stream group or with a newly created stream group.

Stream groups are reflected in the Streams2 Groups Table 858, the Streams2 Group Table 860 and the Streams2 Group Streams Table 862. More specifically, the Streams2 Groups Table 858 contains a record for each Stream Group, as identified by Stream Group ID, associated with a particular account. The Streams2 Group Table 860 provides Stream information corresponding to each Stream Group, as identified by Stream Group ID. Such Stream information includes, for example, the Stream Group name, and the title, author, description, associated key words and type of Stream Group. Lastly, the Streams2 Group Streams Table 862 identifies each Stream comprising a given Stream Group. Additionally, the Table 862 identifies the corresponding bit rate for the particular stream. By characterizing streams into groups, clients are able to easily track a particular piece of content and provide to their end users 104 the stream having the appropriate media format and bit rate.

The client side web site also preferably presents a web page for managing stream groups that parallels the page provided for managing playlists. For example, a stream group may be selected, identifying information, such as name, title, description, keywords and the like maybe edited, and the content of the stream group may be modified by adding or removing content (by adding or deleting, respectively, a record in the Stream2 Group Streams Table 862).

Alternatively, as with all content management functions, the stream groups may be edited via the client side web site as described by passing variables in a query string to a script. In one such embodiment, the script requires values for three parameters: username password; and stream group action, which may indicate: adding a stream to an existing group; creating a new group; editing a group; removing a stream from a group; listing the stream groups; or listing the groups and the contents thereof. Depending upon the action specified, the following optional parameters must be specified: name; title; description; author; keywords; miscellaneous, metadata of the group; whether promotable; stream group ID (used to specify a group to be edited or removed or to edit streams within a group); and stream action. Stream action, in turn, may indicate: adding a stream; removing a stream; removing all streams; stream ID(s) (specified when adding or removing a particular stream).

The Stream2 Details Table 870 is related stream groups. Each record in the Stream2 Details Table 870 corresponds to a stream, as specified by stream ID. The information stored for the streams includes: (1) miscellaneous metadata, such as an extension of any other field that was truncated due to length of field restrictions; (2) if the stream supports multi bit rates, a stream group is created containing all bit rate versions of the stream; the stream group ID is stored in the multi bit rate stream group ID field (mbr sg id); and (3) and indication of whether or not the stream supports multiple bit rates (is multi bit rate).

Collectively, the information is used to identify those streams that support multiple bit rates and to identify the particular stream group (out of potentially many to which the stream belongs) corresponding to the stream's multi bit stream group.

Stream Folders

The present embodiment also allows clients 104 to organize content into logical folders. The Streams Folders Table 864 and Folder Content Table 866 permit this. The Streams Folders Table 864 identifies folders, by folder ID, associated with each account ID. Each record also specifies the folder name and the ID of the parent folder, as folders may be hierarchical. The Folder Content Table 866 identifies the content within each folder, as identified by folder ID. More specifically, the present embodiment allows streams, stream groups, and playlists to be included within a folder. Consequently, the folder content Table 866 is designed to specify any of the foregoing types of content. To this end, the folder content Table 866 includes a content type field, which specifies to which of the foregoing types of content the record pertains. Each record also includes a content ID field which specifies the ID of the content to which the record pertains. Thus, if the content type specifies playlists, the content ID field will include the appropriate CG ID; if the content file specifies Stream Group, the content ID field specifies the Stream Group ID; if the content type specifies Stream, then the content ID field includes the Stream ID.

Preferably, the client web page includes a separate page that provides the client 102 the opportunity to both create folders and edit existing folders. To create a folder, the client 102 simply needs to provide the folder name and any parent folder to which the new folder relates and to select content comprising the folder. In essence, for each new folder created, a new record is created in a Streams Folders Table 864, and for each content added to the folder, a new record is created in a Folder Content Table 866. When editing an existing folder, the client web page preferably presents to the client 102 a listing of folders, as identified in the Streams Folders Table 864, and upon the client's selecting a folder, the system retrieves the details corresponding to the content ID stored in a Folder Content Table 866 and displays those details to the clients 102.

Promotability

The present embodiment also provides the clients 102 with the option of marking content as promotable. By marking content promotable, the client 102 essentially authorizes the content management service provider to select the content and place it on any web site operated by the service provider. For example, if a client 102 provides news clippings, it may mark the content promotable, thereby authorizing the service provider to provide a link to the content on the service provider's news page. As illustrated in the CM database 618, Stream Groups may be identified as promotable in the Streams2 Groups Table 858 and folders may be identified as promotable in the Streams Folders Table 864. Clients 102 may indicate that a particular content is promotable when up loading the content, or creating or editing a folder and stream group. In alternate embodiments, individual streams may be specified as promotable or not by including a promotable field in either of the Assets Table 812 or Streams2 Table 814.

The Database 618 also includes an FTP Info Table 868 for storing the site ID for each FTP Ingest Server 608, as identified by hostname. The Table 868 also identifies the username and password needed to access each FTP Ingest Server 608.

Playlist Resolution

Because the present embodiment does not store streams on the media servers 620 and because clients 102 can have replication sites, the processes of creating the playlist URL and creating the redirector file is different than described with regard to the embodiment of FIG. 1. The differences will now be described with reference to FIGS. 6 and 8.

In the event a client 102 has one or more replication sites and the content to be presented is stored at multiple sites, the client preferably selects the content and the site from which the client desires it to be streamed. For example, a client may have a Japanese language stream; if stored on a site in Japan and a site in the United States, the client may desire it be streamed from the site in Japan. Consequently, the playlist URL of the present embodiment includes and indication of not only the content (e.g., stream ID, CG ID), but also an indication of the location (e.g., site ID) from where the content should be streamed. An exemplary playlist URL, in which the playlist server 622 is "playlist.company.com", the program to dynamically generate the redirector file is "makeplaylist.dll", the CG ID is "12345" and the site ID is "16", is as follows:

<href="http://playlist.company.com/makeplaylist.dll?CG_ID=12345&SITE_ID=16">

The playlist URL is constructed generally as described above. However, when the playlist is created, the system preferably provides the client 102 with a series of URLs, each corresponding to a different site at which the content is stored, and specifies the site name and time zone, as retrieved from the Sites Table 834. Alternatively, the client manually enters the site ID.

As with the previous embodiment, the makeplaylist component dynamically generates a redirector file based on the CG ID and, in the present embodiment, the site ID. More specifically, the component causes the playlist server 622 to access the Content Group Streams Table 826 and identify the streams within the identified playlist and their sort order. For each such stream, the server accesses the Streams2 Table 814 and retrieves the URL prefix and filename. As described in greater detail below, because the content is stored on the storage servers 606, and not the media servers 620, the filename refers each stream's filename as stored on the storage server 606.

The playlist server 622 also accesses the Stream-Servers Table 830 to identify the hostname of the server on which each stream resides. It should be noted that because the client has a replication site with the stream, there will be multiple records in the Stream-Servers Table 830 for each stream ID. Consequently, the playlist server 622 must determine which record corresponds to the site identified in the playlist URL. The server does this by accessing the Servers2 Table 832 and identifying the record having both one of the hostnames previously identified from the Stream-Servers Table 830 and the site ID from the URL. The hostname from this record is used in creating the redirector file. The system does this for each stream in the playlist.

In certain embodiment, a site will include multiple streaming media servers 622 capable of streaming a given content file. In other words, multiple media servers 622 can be coupled to a single storage server 606. In such an instance, the system must determine which of the media servers 620 to use. This many to one relationship will be reflected by multiple records in the Servers2 Table 832 having the appropriate site ID. In one embodiment, the decision is random or pseudorandom. However, in the present embodiment, the decision is based on load balancing and the weight field in the Servers2 Table 832.

The weight field is a preset indication of the percentage of streams to be served from a given media server 620, as compared to other media servers 620 capable of streaming the same content. For example, if two media server 620 were coupled to a given storage server 606 and could stream a file, and one could serve twice the streams of the other, then the weight of the higher capacity server would be approximately 66 and the weight of the lower capacity server would be approximately 33 When determining from which server to stream, the system would analyze the ratio of current streams being served of the two servers and utilize the server streaming a percentage of the total streams less than its weight. In other words, the system would seek to maintain the ratio of streams served equal to the ratio of the weights.

Once the media server hostname is determined, the component on the playlist server 620 obtains the filepath prefix from the record in the Stream-Servers Table 830 corresponding to the relevant stream id and hostname. As will be described in greater detail, the filepath prefix serves as a mounting point for the media server 620 so that the media server 620 can access the storage server 606 to read the requested stream. This filepath prefix is appended to the beginning of the filename and placed in the redirector file.

An exemplary redirector file, in which the playlist comprises a single stream having a stream ID of "2000" and a filename of "/test/10/2000.asf", the media server 620 hostname is "mediaserver.company.com", and the mounting point is "proot1/PubShare01", is as follows:
<ASX>
  <ENTRY>
    <REF>
HREF="mms://mediaserver.company.com/proot1/PubShare01/test/10/200.asf">
  </ENTRY>
</ASX>

It should be noted that in the present embodiment, the mount point is the same as the root share and share information for the server volume ID. Therefore, the media server 620 may read the correct contents of the storage server 606. Placing the filepath prefix in the redirector file is useful in situations where files stored on a storage server 606 are not allowed to be stored in one single share, but multiple shares are preferably created for the sake of efficiency of the backup and recovery processes (e.g., mirroring a portion of all shares). In this scenario, the hard drive(s) storage space on a storage server 606 is required to be stored under one of those shares.

By way of illustrative example, the Archive Volume Table 820 currently has the following record for a share created on the PUB01 storage server 606. The record in the Archive Volume Table 820 for that filer/share combination is as follows: cm_vol_id=142; volume_type=S; archive_server=\\PUB01; share=/PubShare01; server_addr=pub01.broadcast.com; platform=B; max_content_kb=131072000; status=CE; site_id=16; local_path=NULL; checking_status=[not used]; server_category=PUB; root_share=/proot1; attach_type=N; total_kb_used=90455873.

This would cause a record to be created in the Stream-Servers Table 830 having a filepath prefix of /proot1/PubShare01.

Let's say that the file path stored in the filename column in streams2 table was '/test/10/2000.asf'. Assuming that the stream ID 2000 was a Windows Media stream that is accessed with the mms protocol, then playlist will construct the final URL as follows:

mms://mediaserver.company.com/proot1/pubshare01/test/10/2000.asf

In this scenario, for this URL to work correctly, the streaming server must have a mount point with the same name as the first component of the URL after the server hostname. In the above case example, the server name is mediaserver.company.com, and the first component of the URL after that hostname is "proot1." So, a mount point having the name proot1 is created on the streaming server such that it points to the following LAN file storage path: \\PUB01\proot1

A root share is optional, and is used only to reduce the number of mount points needed to be created on a streaming server in a situation whereby the storage device or hard drive on a storage server 606 has more than one share on it (for such reasons as efficiency of the backup processes).

A storage share on a storage server, however, is required because the systems will store a file in that share (further organized in account specific directory, such as test in the above example, and a hashed directory such as '10' in the above example). In the above example, the storage server 606 \\PUB01 has the following shares: proot1 and pubshare01.

Those skilled in the art will recognize that the method and system of the present invention has many applications, may be implemented in many manners and, as such, is not to be limited by the foregoing exemplary embodiments and examples. In this regard, any number of the features of the different embodiments described herein may be combined into one single embodiment. Moreover, the scope of the present invention covers conventionally known and future developed variations and modifications to the system components described herein, as would be understood by those skilled in the art.

The invention claimed is:

1. A method comprising:
    receiving, by an ingest server, digital content from a client;
    storing, by a repository server, the digital content, the digital content having an associated server hostname and a filename;
    assigning a unique identifier to the digital content, and associating the unique identifier, server hostname and filename;
    providing the client with a link containing the unique identifier but not the server hostname and filename associated with the digital content's unique identifier;
    receiving, by a playlist server, a request for the content, the request based on activation of the link, the request including the unique identifier but not the server hostname and filename associated with the digital content's unique identifier;
    determining, by the playlist server, the server hostname and filename based on the unique identifier received with the request;
    creating, by the playlist server, a redirector file, the redirector file including the server hostname and filename associated with the digital content's unique identifier, the redirector file is returned in response to the request.

2. The method of claim 1, wherein the unique identifier is a stream identifier.

3. The method of claim 1, wherein the unique identifier is the name of the digital content.

4. The method of claim 1, wherein the digital content is a streaming media file.

5. The method of claim 1, wherein the digital content is a playlist comprising multiple streaming media files.

6. The method of claim 1 wherein the link specifies a program for determining the hostname and filename based on the unique identifier.

7. A method of providing an end user access to digital content, the method comprising:
    causing digital content to be stored, by a repository server, and a unique identifier to be assigned to the digital content, the digital content having a server hostname and a filename when stored, the unique identifier of the digital content being associated with the digital content's server hostname and filename;
    receiving, by an ingest server, the unique identifier to the digital content but not the server hostname and filename associated with the digital content's unique identifier;
    publishing a link for activation by the end user, the link including the unique identifier of the digital content but not the server hostname and filename associated with the digital content's unique identifier,
    wherein activation of the link causes resolution of the unique identifier into the server hostname and the filename of the digital content, and causes the digital content to be provided to the end user, by a playlist server, based on the server hostname and filename of the digital content determined using the unique identifier.

8. The method of claim 7, wherein the unique identifier is a stream identifier.

9. The method of claim 7, wherein the unique identifier is the name of the digital content.

10. The method of claim 7, wherein the digital content is a streaming media file.

11. The method of claim 7, wherein the digital content is a playlist comprising multiple streaming media files.

* * * * *

UNITED STATES PATENT AND TRADEMARK OFFICE
CERTIFICATE OF CORRECTION

PATENT NO. : 7,640,320 B2  
APPLICATION NO. : 10/466132  
DATED : December 29, 2009  
INVENTOR(S) : Madison et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1937 days.

Signed and Sealed this

Ninth Day of November, 2010

David J. Kappos  
*Director of the United States Patent and Trademark Office*

US007640320C1

(12) INTER PARTES REEXAMINATION CERTIFICATE (1052nd)
United States Patent
Madison et al.

(10) Number: US 7,640,320 C1
(45) Certificate Issued: Feb. 11, 2015

(54) METHOD AND SYSTEM FOR MANAGING DIGITAL CONTENT, INCLUDING STREAMING MEDIA

(75) Inventors: Justin Paul Madison, Richardson, TX (US); Anthony Joseph Rodiger, The Colony, TX (US); Syed Noman Kazmi, Plano, TX (US); William David Turner, Dallas, TX (US); Steven Alexander Roberts, Richardson, TX (US); Ghousuddin Syed, Richardson, TX (US); Vinay Polavarapu, Irving, TX (US); Bhargavaram Bulleyya Gade, Irving, TX (US)

(73) Assignee: Yahoo! Inc., Sunnyvale, CA (US)

Reexamination Request:
No. 95/001,794, Oct. 26, 2011

Reexamination Certificate for:
Patent No.: 7,640,320
Issued: Dec. 29, 2009
Appl. No.: 10/466,132
PCT Filed: Jan. 18, 2002
PCT No.: PCT/US02/01840
§ 371 (c)(1),
(2), (4) Date: Jul. 9, 2003
PCT Pub. No.: WO02/057943
PCT Pub. Date: Jul. 25, 2002

Certificate of Correction issued Nov. 9, 2010

Related U.S. Application Data

(60) Provisional application No. 60/263,058, filed on Jan. 18, 2001.

(51) Int. Cl.
*G06F 15/16* (2006.01)

(52) U.S. Cl.
USPC .......... 709/219; 709/203; 709/204; 709/216; 709/218; 709/226; 707/770; 707/783

(58) Field of Classification Search
None
See application file for complete search history.

(56) References Cited

To view the complete listing of prior art documents cited during the proceeding for Reexamination Control Number 95/001,794, please refer to the USPTO's public Patent Application Information Retrieval (PAIR) system under the Display References tab.

*Primary Examiner* — Joshua Campbell

(57) ABSTRACT

Method and system for uploading, managing and delivering digital content, including streaming media. The system according to one embodiment allows receives digital content from the client (102), assigns a stream identifier (ID) to the content and stores the content. The client is given a playlist uniform resource locator (URL) for publishing on its web site (610), the URL including the stream ID. Activation of the URL by an end user (104) causes the stream to be served to the end user, without the client receiving or providing an indication of the specifics of where the content was stored. An embodiment of the present provides a system and method that permit clients to actively manage their content, including defining logical folders and subfolders containing item(s) of the content and defining logical stream groups, containing items of the content.

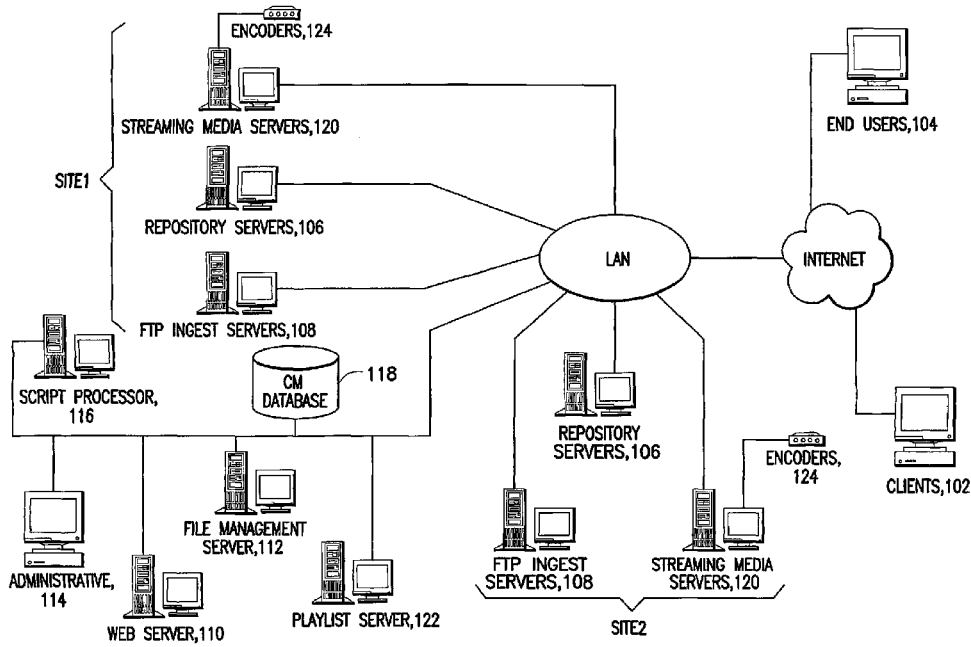

INTER PARTES REEXAMINATION CERTIFICATE ISSUED UNDER 35 U.S.C. 316

NO AMENDMENTS HAVE BEEN MADE TO THE PATENT

AS A RESULT OF REEXAMINATION, IT HAS BEEN DETERMINED THAT:

The patentability of claims 1-4 and 6-10 is confirmed.

Claims 5 and 11 were not reexamined.

\* \* \* \* \*